United States Patent [19]
Arcuri et al.

[11] Patent Number: 5,493,678
[45] Date of Patent: Feb. 20, 1996

[54] METHOD IN A STRUCTURE EDITOR

[75] Inventors: Anthony J. Arcuri, Poughkeepsie; William S. Cadden, Saugerties, both of N.Y.; Patrick C. Mancuso, North Andover, Mass.; Frederick P. Muller, Lake Katrine; Kurt A. Riegel, Kingston, both of N.Y.; Robert C. Seacord, Pittsburgh, Pa.; David W. Stafford, Stony Point, N.Y.

[73] Assignee: International Business Machines Corporation, Armonk, N.Y.

[21] Appl. No.: 313,661

[22] Filed: Sep. 27, 1994

Related U.S. Application Data

[63] Continuation of Ser. No. 248,835, Sep. 26, 1988, abandoned.

[51] Int. Cl.⁶ .................................................... G06F 15/40
[52] U.S. Cl. ................... 395/600; 364/282.1; 364/283.1; 364/283.2; 364/DIG. 1
[58] Field of Search ............................. 341/79; 395/600

[56] References Cited

U.S. PATENT DOCUMENTS

| | | | |
|---|---|---|---|
| 4,075,689 | 2/1978 | Berkling | 364/200 |
| 4,318,184 | 3/1982 | Millett | 364/900 |
| 4,447,875 | 5/1984 | Bolton | 364/200 |
| 4,468,728 | 8/1984 | Wang | 364/200 |
| 4,611,298 | 9/1986 | Schuldt | 364/900 |
| 4,613,946 | 9/1986 | Forman | 364/518 |
| 4,656,603 | 4/1987 | Dunn | 364/521 |
| 4,677,550 | 6/1987 | Ferguson | 364/200 |
| 4,710,763 | 12/1987 | Franke | 364/518 |
| 4,763,277 | 8/1988 | Ashford | 364/900 |
| 4,764,867 | 8/1988 | Hess | 364/200 |
| 4,813,010 | 3/1989 | Okamoto | 364/900 |
| 4,817,036 | 3/1989 | Millett | 364/900 |
| 4,831,525 | 5/1989 | Saito | 364/300 |
| 4,860,204 | 8/1989 | Gendron | 364/300 |
| 4,866,635 | 9/1989 | Kahn | 364/200 |
| 4,868,743 | 9/1989 | Nishio | 364/200 |

OTHER PUBLICATIONS

IEEE Transactions on Software Engineering, vol. SE–7, No. 5, Sep. 1981, "An Incremental Programming Environment".
AFIPS Conf. Proceedings, 1985 National Computer Conf. "Programming Environments Based on Structure Editing: The GNOME Approach".
A Second Conf. on Software Development Tools, Techniques, and Alternatives "Formal Specification of Syntax Directed Editor".

*Primary Examiner*—Eric Coleman
*Attorney, Agent, or Firm*—William A. Kinnaman, Jr.

[57] ABSTRACT

The present invention relates to a method for providing improved editing capability in a structure editor, and more particularly for syntax-directed editors. A set of methods provide an approach to selecting arbitrary nodes from within a tree, and using those arbitrarily selected groups of nodes in otherwise conventional editing operations such as move, copy, delete, collect, and the like. In syntax-directed editors, the present invention provides a way of maintaining syntax while these novel and highly flexible editing operations are performed.

16 Claims, 10 Drawing Sheets

METHOD IN A STRUCTURE EDITOR

This application is a continuation of application Ser. No. 07/248,835, filed Sep. 26, 1988, now abandoned.

BACKGROUND OF THE INVENTION

1. Field of the Invention

The present invention relates to information handling systems, particularly computer systems for manipulating related data and more particularly to editors for editing related data where the data and relationships can be expressed as a hierarchy, or tree, with data elements forming the nodes and relationships defining the placement of a node within the tree structure. The data and relationships expressed by a tree structure are referred to as "tree structured data".

2. Background of the Invention

Editors are typically comprised of: a user interface to accept commands from the user and display the results of the action; data manipulation processes to perform the necessary editing functions; data storage means to maintain the data and relationships; and (optionally) syntax rules expressing the valid relationships between data nodes for use by the data manipulation processes in validating requested actions.

The manipulation of data represented in a tree structure includes the following functions:

- inserting a new data node or set of nodes into the tree structure;
- deleting a data node or set of nodes from the tree structure;
- copying a data node or set of nodes to a new position in the structure; or
- moving a data node or set of nodes to a new position in the structure.

The manipulation functions must preserve any existing relationships between nodes including relationships among a set of nodes to be inserted, deleted, copied or moved.

There have been many systems developed for editing tree structured data. Theme systems, called generally structure editors, have been primarily concerned with editing formally specified programming languages. These editors seek to enforce syntax rules expressing valid relationships between data nodes. Many modern programming languages, and formal languages in general, possess an underlying structure or hierarchy of statements which may be expressed as a tree, known as a parse tree. The relationships forming the tree provide a natural way for manipulating the data.

Programming languages have syntax rules governing the relationships, or trees that are valid for that language. These rules must be followed exactly or the program is meaningless. As a consequence, editors have been developed to assist in the creation and maintenance of programs by enforcing the rules of the language in which the program is written and allowing selection of data to be manipulated based on an understanding of the underlying structure of the program. These editors are known variously as "language based editors" or "syntax-directed editors".

Implementations of editors such as these that are known to the inventors fall into two broad classes. The first provides user interface very similar to that of a standard line or character oriented text editor. Editing works with a textual description of the program, from which the structure is regenerated after each editing operation. If the structure cannot be regenerated, or the regenerated structure is in violation of some syntax rule, the editor either rejects the editing operation or makes its best guess as to how to form the result so that a valid structure may be regenerated.

The advantages of such a scheme are that it is quite general, having no restrictions on what set of characters may be used in editing operations, and that the editing model can be made very familiar to programmers who are currently working with simple text editors. If the editor attempts to create a valid structure from the invalid one the programmer has given it, much of the programmers work can be done automatically as long as the editor generates the structure the programmer had intended. These advantages are also the cause of the scheme's disadvantages, however. The total generality makes it quite simple for a programmer to make the same mistakes that he or she would have made without the syntax-directed editor, and now these mistakes are caught at the moment of entry, interrupting the work, forcing the errors to be corrected. In addition, if the editor attempts to correct the error itself it is likely to do something that, while strictly correct, is not intended by the programmer. If the correction is not in the same direction the programmer had been thinking the programmer must correct not only his or her own error, but also the misinformation the editor generated. This scheme is also fairly inefficient, as little advantage may be taken of the existing structure in order to regenerate the new structure, causing a duplication of effort of the part of the editor. In the process of editing, programmers quite often create incorrect programs as short term intermediate steps in the editing process. This sort of editor either does not allow these steps or fixes them itself, with the possibility (as discussed above) of doing so incorrectly. An example of such an editor is found in the COPE Programming Environment, developed by Richard Conway et al. at Cornell University.

The other class of syntax-directed editors manipulates the structure of the tree directly. The user interface for this class of editors is typically graphical with the user able to work with graphic images representing groups of program statements. The graphic images are displayed as a tree connected according to the specified hierarchical relationships. Only operations that result in a valid tree are allowed to complete. The operations are specified in terms of complete subtrees (a complete subtree consists of a node and all of its children, and their children, and so forth, until no further children are available) and these subtrees may be moved or copied to become subtrees of other nodes, or may be deleted entirely. New nodes or predefined subtrees may be inserted as children of existing nodes as well.

This class of editors is highly efficient, as only the structure of the tree is being manipulated. It also prevents many common errors from ever being made, as only complete structures may be moved around. Unfortunately, it is very restrictive for daily use as an editor. While subtrees are indeed basic to proper manipulation of programs, single complete subtrees are rarely useful. Quite often a programmer wishes to remove a level from the node hierarchy, or insert a level into it. This operation is basic to editing a program beyond the earliest first pass at writing the program which often ends as early as five minutes past the decision to write the program at all. This disadvantage is the main one inhibiting this method from being useful as a basic editing model.

In addition, programmers almost invariably work with several ranges of subtrees (corresponding to ranges of lines) and the simple subtree operations model often doesn't support such operations. An enhancement to some editors represents a subtree following an earlier subtree as the last child of that subtree. This allows a "sequential" list of statements from an arbitrary start position to the end of the sequence at that level of the hierarchy to be represented as a proper subtree. A further enhancement, allowing the final child of a node to be considered detached from the subtree being manipulated, allows sequential statements which can be considered to be partial subtrees, to be moved in one operation with no further restrictions. However, these enhancements are difficult to fit into an editing model based on complete subtrees. Even with these enhancements, the model is still restrictive, for example, allowing nodes only to be added as subtrees of existing nodes, not as parents of existing nodes.

Examples of editors using this model are the Cornell Program Synthesizer, developed by Tim Teitlebaum et al. at Cornell University; and the Xinotech Program Composer, developed by Xinotech Research, Inc.

SUMMARY OF THE INVENTION

The present invention relates to providing a structure editor that is not limited to operations on complete subtrees. The preferred embodiment provides data manipulation methods for operating on one or more partial subtrees. The methods implement data insertion, deletion, copying and moving, improved generalized scoping methods for selecting the data for operation, and generalized targeting methods for specifying the resulting data location and relationships. In addition, the preferred embodiment relates to the performance of node insertion, deletion, copying and moving through combinations of sub-operations including collecting the set of subtrees which comprises the scope; deleting nodes comprising the scope; and grafting the nodes comprising the scope at the point indicated by the generalized target. An extension to the preferred embodiment relates to providing a syntax directed editor that enforces specified syntax rules. The methods of the preferred embodiment are operable with a variety of user interfaces, data storage schemes, and syntax rule specifications.

Accordingly, it is an object of the present invention to provide flexible insert move, copy, and delete operations in a structure editor while maintaining the valid structure of a tree. Further objects are to provide the ability to:

Move, copy, and delete arbitrary selections of nodes within a tree rather than only complete subtrees.

Maintain the relative structure (i.e. nesting and left to right relationships) of both selected and unselected nodes.

Move, copy, and insert selected nodes as the parent of an existing node (i.e. insert the new nodes around the existing node).

Move, copy, and insert selected nodes as all the children of an existing node (i.e. insert the new nodes between the parent node and its children).

Move, copy, and insert selected nodes as children of an existing node.

Maintain the rules concerning the valid structure of the tree as these and other operations are performed.

It is a still further object of the present invention to provide high speed graft and replace operations on memory efficient parse trees, while maintaining the valid structure of the trees.

It is still a further object of the present invention to provide the ability to:

Store trees using n-ary nodes (i.e. nodes that have an arbitrary number of nodes connected to them), thus saving significant storage space.

Efficiently check that the children of a node within a parse tree are of valid type and in valid order.

Graft a list of subtrees after a specific child of a node, and ensure that the resulting node with its children is syntactically correct.

Replace a list of subtrees below a specific node with a new list of subtrees, and ensure that the resulting node with its children is syntactically correct.

According to one aspect of the present invention an editing method is provided for collecting one or more groups of one or more related n-ary data elements, or nodes, for a subsequent operation. All nodes in the tree to be collected are selected, and each highest order node so selected is identified. For the identified highest order node, all selected descendants are identified. The descendants are then connected to the highest order node to form a simply connected subtree wherein the relative hierarchy is preserved as between the descendants and the highest order node.

According to a further aspect of the invention, an editing method is provided for deleting one or more groups of one or more simply connected n-ary data elements, or nodes, from a tree. One or more groups of one or more simply connected nodes of said tree are selected for deletion. The parent node of the top-most node of each selected group of nodes is identified. The children of each selected group of nodes are also identified. The selected groups of nodes are then deleted. Finally, the children of each deleted group of nodes are connected to the parent of the top-most node of each deleted group.

According to a still further aspect of the present invention a method is provided for inserting subtrees of n-ary data elements, or nodes, into a tree around a selected node. A list of subtrees is provided, and a target node is selected. The target node is disconnected from its parent node. The list of subtrees is connected to the parent node, as the children thereof. Finally the disconnected target node is connected to the list of subtrees by testing, in a predetermined sequence, to determine the first of the bottom-most nodes of the parent node to which the target node and its children may connect. The target node is connected when the determination is that such connection can be made.

According to a still further aspect of the present invention a method is provided for inserting one or more subtrees of n-ary data elements, or nodes, into a tree connected to a selected node. A list of subtrees is provided, and a target node is selected. The children of the target node are disconnected. A list of subtrees is connected to the target node, as the children thereof. Finally, the disconnected children are connected to the list of subtrees by testing, in a predetermined sequence, to determine the first of the bottom-most nodes of the list of subtrees to which the disconnected children may connect. The children are connected when the determination is that such connection can be made.

According to a still further aspect of the present invention, a method is provided in a structure editor that generates and manipulates nodes that interconnect to form a tree structure in accordance with a set of rules, for determining whether a first node can connect to a second node. According to this aspect of the invention, for at least some of a set of nodes that form a tree, one or more subsets of rules from the aforementioned set of rules are defined, regarding the type of nodes, and the arrangement thereof that are permitted to be connected to the nodes as children thereof, wherein the types of nodes are potentially different among themselves such that the rules are of a first and a second level. The first level rule is for determining whether a given node may connect upon application of the rule, without need for application of further rules. The second level rule refers directly or indirectly through other second level rules to at least one first level rule for determining whether a given node may connect. Upon performance of an operation requiring connecting two or more nodes, those rules are applied based on the node into which the other node or nodes are to connect.

Finally, according to a still further aspect of the present invention, a method for connecting nodes to one another is provided in a structure editor in which data elements or nodes are copied, deleted, moved or inserted. Nodes to be connected to a tree are selected. A first set of rules regarding hierarchical relationships and order relationship between the selected nodes and the existing tree are provided. The first set of rules are used with respect to the selected nodes to identify one or more connections to nodes in the tree. A second set of rules is provided regarding permitted arrangement of nodes in the tree. The identified connections are tested, using the second set of rules, to determine whether the second set of rules is satisfied in the connection. If the second set of rules is satisfied the connection is made.

Thus, it will be appreciated that the present invention provides an approach to providing for substantially improved flexibility in editing operations in structure editors. Arbitrary selections of nodes in a tree may be identified for operations such as collection, deletion, or insertion. Further, in editors in which a syntax is enforced, the present invention provides a powerful approach to permitting these highly flexible operations while maintaining the underlying syntax.

The foregoing and other objects, features and advantages of the invention will be apparent from the more particular description of the preferred embodiments of the invention, as illustrated in the accompanying drawing.

BRIEF DESCRIPTION OF THE DRAWINGS

FIG. 2b shows the three subtrees resulting from the application of a collecting operation on the tree shown in FIG. 2a.

DETAILED DESCRIPTION OF THE PREFERRED EMBODIMENT

Table of Contents of the Detailed Description of the Preferred Embodiment

Figure 1:
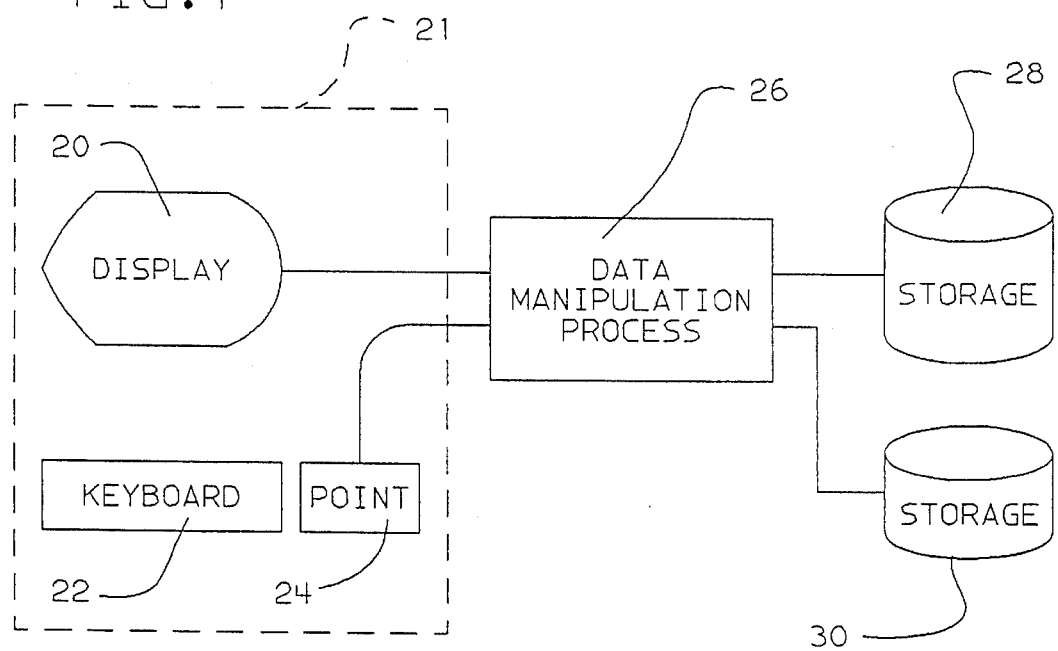
FIG. 1 is an example of an editing system incorporating the present invention.

1. Overview of the Preferred Embodiment
2. Specification Language
3. Utility Functions Used in the Preferred Embodiment
   I. Tree Manipulation
   II. Set Manipulation
   III. List Manipulation
4. Base Function Definitions
5. Main Functions
6. Extensions to Preferred Embodiment
7. Utility Functions Used by the Extensions
8. Data Needed for the Extensions
9. Base Function Definitions for the Extensions
10. Main Functions of the Extensions
1. Overview of the Preferred Embodiment The present invention relates to a flexible scope editing method in a structure editor. The components of a typical editing system configuration, including a structure editor, is shown in FIG. 1. The editing system has a user interface 21, a data manipulation process 26, data structure storage device 28 and, optionally, structure syntax rules 30. The user interface 21 typically includes a video display screen 20 or similar device for displaying the structure or statement to be edited, a keyboard 22 for entering information and a pointing device 24 such as a mouse for selecting data items from a screen display. Data manipulation process 26 performs the editing functions, including structure editing to create or modify data to be stored on storage device 28. In one embodiment, syntax rules governing the data structure are stored in data storage 30. Data storage 28 and 30 can be fixed or flexible magnetic disks, magnetic tape or like devices. It will be recognized that this is but one environment in which the method of the present invention could be implemented and it is not intended to limit the application of the method.

The preferred embodiment provides an inventive flexible scope editing method as part of Data Manipulation Process 26. The flexible scope editing method provides a means to insert, delete, copy, or move data nodes in hierarchically or tree structured data. The present invention relates to the provision of flexible scoping (i.e. the selection of data nodes for editing operations without restriction, for example, to complete subtrees) and generalized targeting. An editor implementing the preferred embodiment may present the structured data graphically on video display 20. A graphical display might take the form of FIG. 2a though many other forms are possible. Selection of data during scoping and for target specification can be accomplished by using the pointing device 24 to indicate the appropriate data nodes. It will be understood, however, by those with skill in the art, that the present invention is not limited to applications with graphics display and could be implemented using a text display without a pointing device.

There are two major ideas behind providing generalized structure editing operations: scopes and targets. The generalized structure editing operations work directly on the structure of the data (i.e. the relationships between the data, as the subtree method does). The method of the preferred embodiment, in addition, provides flexible scoping and generalized targets, i.e. it places no restrictions on the relationships among the selected data (scope) and the position where that data is to be moved or copied (target).

The generalized scope of the preferred embodiment is the set of nodes selected for a subsequent editing operation. The user interface for selecting the nodes can be any standard or customized interface, as discussed above. However, the following selection operations are suggested for adding or removing nodes to the scope set.

| | |
|---|---|
| scopeSubtree | given a node (e.g. indicated by the pointing device), add it and all its descendents to the set of nodes that makes up the scope; if the given node was in the scope set to begin with, however, remove it and its children from the scope set. |
| scopeNode | given a node, add it to the scope; if it was already in the scope set, remove it from the set instead. |
| scopeRange | given two nodes, find the smallest sequence of siblings (siblings are nodes that share a common parent and one is the next node after the other in the sequence of nodes under that parent), including the subtrees under that sequence that contains the two nodes and, if the first node of the two was previously in the scope set then remove that sequence of subtrees from the scope set, otherwise add it to the set. |

The generalized target of the preferred embodiment is specified as a node and a relationship to that node. The scope is copied or moved to the target and inserted according to the specified relationship. The relationships are:

| | |
|---|---|
| Left | As a sibling of the target node. |
| Right | As a sibling of the target node. |
| Around | As the parent of the target node. |
| Within | As a child of the target node, such that all the the target nodes children are now children of the new node(s). |

The method of the preferred embodiment of the present invention provides for move, copy, insert, and delete operations given an arbitrary set of nodes (the scope), and (for move, copy and insert) also provides specification of a generalized target. The generalized target allows for making complex changes to the tree in one natural step that, under prior art methods, required two steps. The generalized scope allows very powerful editing operations that may be considered intuitive and yet required many counter-intuitive operations in other methods.

A concept involved in the preferred embodiment is that of nodes being simply connected. A group of nodes is simply connected if simple connections exist between the nodes such that by starting at one node all other nodes can be reached by crossing one or more simple connections. A simple connection is a pointer from one node to another.

At the highest level, the method involves breaking move, copy, insert, and delete into the following three steps: 1. Collect Subtrees: collect the list of subtrees that can be made from the scope, 2. Delete: delete the nodes that make up the scope, and 3. Paste: paste the list of subtrees at the target location. The paste operation uses the generalized target, while the collecting of subtrees and deletion of scoped nodes involves flexible scoping. Basic move, copy, delete, and insert operations are performed by combining one or more of the above steps.

Figure 2A:
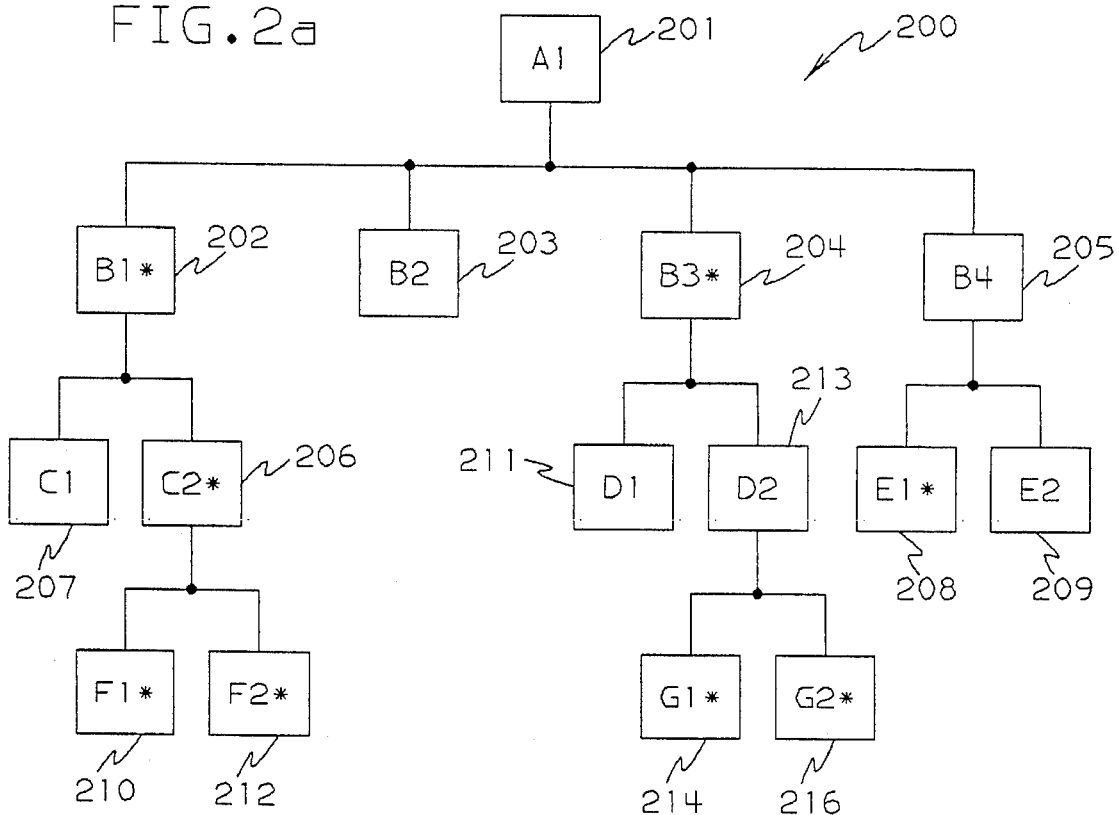
FIG. 2a is an example of a tree of the type that is created and manipulated in a structured editor, presented for the purpose of illustrating scoping.

These basic operations are best demonstrated through examples illustrated by the figures. FIG. 2a shows a tree 200 with eight nodes (202, 204, 206, 208, 210, 212, 214, 216) selected for inclusion in the scope of a subsequent operation. (These scoped nodes are indicated by an asterisk.) Collecting the scope produces the three element list of subtrees shown in FIG. 2b (220, 222, 224); where the prime (e.g. G2'and 216') indicates that this is a copy of the original node. (When the collect and delete operations are combined into one step, the actual nodes are collected rather than copied.)

Figure 3:
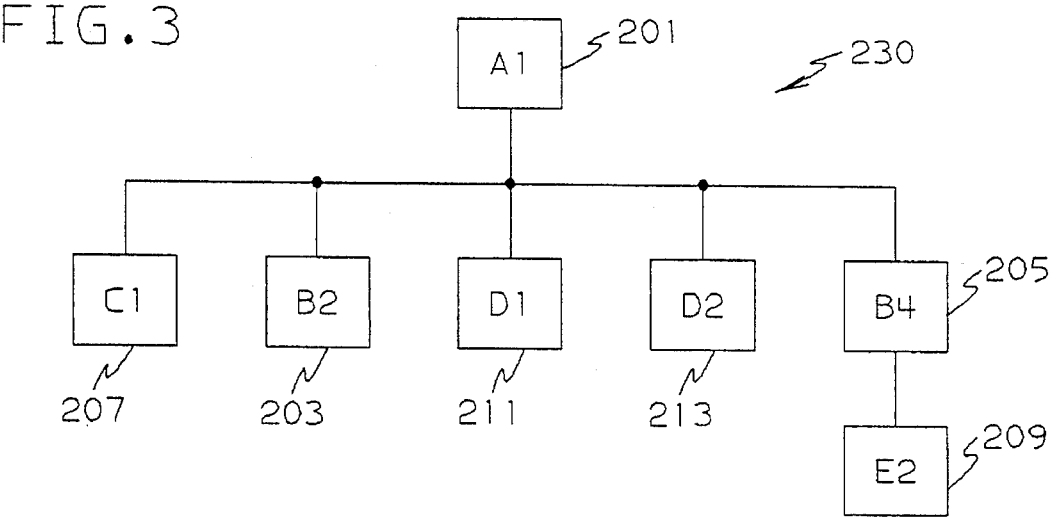
FIG. 3 shows the tree that results after a delete operation on the nodes scoped in FIG. 1.

Deleting the scope results in the structure 230 shown in FIG. 3.

Figure 4:
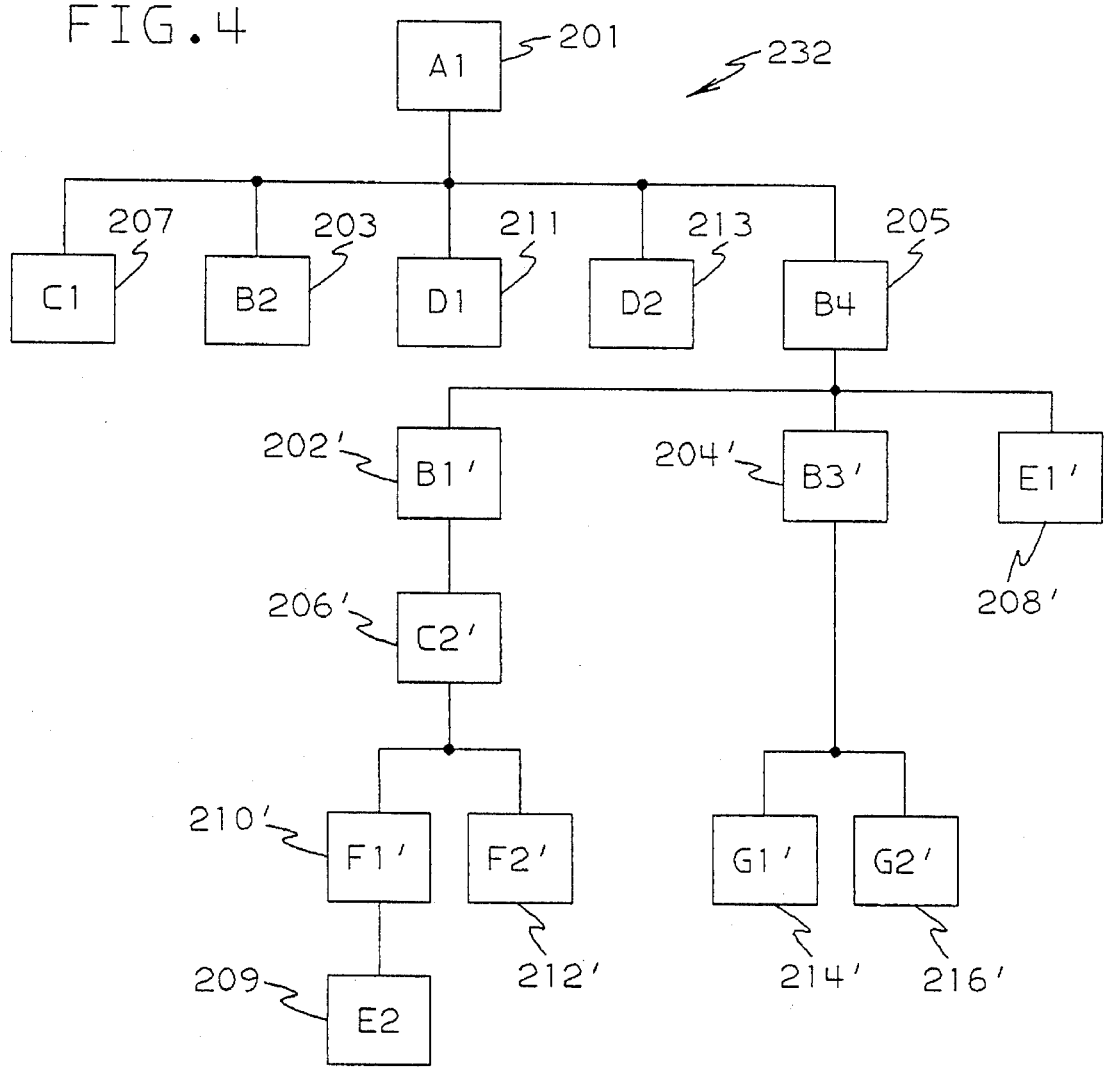
FIG. 4 shows the tree that results from pasting the list of subtrees shown in FIG. 2 around the E2 node of the tree shown in FIG. 3.

Selecting element E2 209 in FIG. 3 as the node and "Around" as the relationship of a generalized target, pasting the scope according to the generalized target results in the structure 232 shown in FIG. 4.

The end result of a Collect Subtrees, combined with a Delete, followed by a Paste is a move of the scoped nodes, maintaining their relative ordering in both dimensions (ancestorhood and left to right sibling relations), to the target location. If the Delete is not done, the result is a copy operation. If only the Delete is done, then a delete operation is the result. Finally, if a node is created external to the tree (not based on the scope) and then Pasted, the result is an insert of that node into the tree.

The preferred embodiment of a flexible scope editing method according to the present invention will now be described. The description presents a specification language used in the disclosure of the steps of the method. This is followed by a description of utility functions or methods used by the preferred embodiment, base functions, based on the utility functions, and main functions describing the principle steps of the method for flexible scope editing. Following the main functions is the description of an extension to the preferred embodiment incorporating syntax rules and syntax checking for valid structures. A description of the utility functions, data, base functions and main functions of this extension to the preferred embodiment are then described. In particular, the main functions of the extension provide graft and replace functions that ensure all syntax rules are observed.

2. Specification Language

A simple specification language is used throughout this document for illustrating detailed steps of the present invention. Functions implementing the present invention are presented including a description of the function, definition of the inputs and outputs of the function, and method steps necessary to perform the function. This language allows the following statements:

| | |
|---|---|
| assignment | Simple assignments of the form x = y are allowed. |
| If/Otherwise | A test is phrased in English together with standard relationship operators like "=," "<=" . . . If the test results are true, the statements in the if clause are executed. If the test result is false, the statements in the Otherwise clause are executed. |
| Case Expression of | |
| | A choice is made between several mutually exclusive values of an expression. The statements under the value that matches the expression are executed. |
| While | Execute a number of statements for as long as a certain condition is true. |
| Return | Returns from a subroutine successfully. |
| Fail | Returns from a subroutine unsuccessfully. Returns changes made in the routine to the | condition they were in on entry.

Unless success or failure is explicitly tested for, a routine that fails implies that the calling routine fails as well. If success or failure is explicitly tested for, then alternative processing based on the state tested will occur when a specific call fails.

Comments are enclosed in square brackets.

Variables need not be declared, and are not considered to be initialized to any particular value. Variables have a type (integer vs. string, for example) associated with them by the way they are used.

Subroutines are specified as having a name and input or output parameters with the parameters enclosed in parentheses following the same. Subroutines may have the same name as other subroutines and are distinguished by the type and number of parameters provided to the subroutine.

3. Utility Functions Used in the Preferred Embodiment

It is assumed that the following basic operations are available to implement the preferred embodiment and are provided, for example, by conventional utility functions:

I. Functions for manipulating trees. Tree manipulation is a well understood field, as long as the operations are restricted to the simple ones listed here:

| | |
|---|---|
| graft | Insert a list of subtrees as "leaves" of a node, after a specific child of that node (the null child indicates that the operation is to be done before the first child). This operation may fail due to syntax checking in a syntax-directed editor. The method of the preferred embodiment is designed so that if graft checks syntax, the method will build syntactically correct trees. The method will work, however, whether graft checks syntax or not. (An extension of the preferred embodiment which provides a method of checking syntax within a graft operation is presented below, after description of the move, copy, insert and delete operations of the preferred embodiment.) |
| replace | Disconnect an inclusive range of subtrees from a given parent node, and then replace it with a list of subtrees. Replace may fail due to syntax checking in a syntax directed editor. The method is designed so that if replace checks syntax, the method will build syntactically correct trees. The method will work, however, whether replace checks syntax or not. (A method of checking syntax within a a replace operation is presented below, after description of the move, copy, insert and delete operations of the preferred embodiment.) |
| copyNode | Form a new childless node that is identical to a given node. |
| destroyNode | Mark a node so that is can be destroyed at the end of a delet operation. The method does not make assumptions about the fate of children of a destroyed node. |
| createNode | Create a childless node of a given type. In a simple structured editor all nodes are of the same type. |
| copySubtree | Create a new subtree that is identical to a given subtree. |
| destroySubtree | Mark all nodes in a subtree so that they can be destroyed at the end of a delete operation. |
| getParent | Return the parent node of a given node or null if the node has no parent. |
| getFirstChild | Return the first child of a given node, or null if the node is childless. |
| getLastChild | Return the last child of a given node, or null if the node is childless. |
| getRightSibling | Return the right hand sibling of a node, or null if the node is the last child of its parent. |
| getLeftSibling | Return the left hand sibling of a node, or null if the node is the first child of its parent. |
| getFirstLeaf | Given a subtree, return the first leaf (childless node) within that subtree. Return null if the root of the subtree has no children. |
| getNextLeaf | Given a subtree and a leaf node, return the next leaf node in that subtree, or null if there are no further leaves around. |
| getSubtreeNodes | Add to a set the nodes within a subtree. |

II. Functions for manipulating sets, specifically sets of nodes.

| | |
|---|---|
| create | Create a new empty set. |
| copy | Create a new empty set that is a copy of some existing set. |
| destroy | Remove an existing set completely. |
| insert | Insert an item into the set. |
| delete | Delete an item from the set. |
| query | Determine if an item is in a set. |
| makeEmpty | Make a given set empty. |
| isEmpty | Determine if a given set is empty. |
| getFirst | Return an item in the set. May be any arbitrary item. |
| getNext | Given an item, return an arbitrary item in the set that hasn't been returned since the last getFirst. If there are none left, then return null. |
| difference | Remove from one set those elements which it has in common with a second set. |

III. Functions for manipulating lists of items, specifically lists of subtrees.

| | |
|---|---|
| create | Create a new empty list. |
| destroy | Destroy a list completely. |
| append | Add an item to the end of a list. |
| prepend | Add an item to the beginning of a list. |
| getFirst | Return the first item on the list. |
| getNext | Given a list and an item in the list, return the next item in the list, or null if the item given is the last. |

4. Base Function Definitions

Definitions of subroutines used to describe the steps of the method of the preferred embodiment of the present invention follow.

I. findFirstScoped(root, scope, scopeUnder, node): Given the root of a subtree (the top-most node in that subtree), a set of node identifiers indicating the nodes in the scope, a set of node identifiers indicating which nodes have descendants that are in the scope, return the first node in the subtree that is contained in the scope, where "first" in this case is recursively defined as the leftmost child of the root of the given subtree if that child is in the scope, or if not, the first scoped node in the leftmost subtree of the root of the given subtree, or if there is none, apply the preceding tests to the remaining children of the root of the given subtree, and if no children remain before the first scoped node is discovered then there is no scoped node below the root of the given subtree.

Returning to the previous example, described with reference to FIGS. 2–4, the scope set is B1, B3, C2, E1, F1, F2, G1, and G2 (nodes 202, 204, 206, 208, 210, 212, 214, 216). The scopeUnder set (those nodes which have descendents in the scope set) contains A1, B1, B3, B4, C2 and D2 (nodes 201, 202, 204, 205, 206, 213). The function findFirstScoped given B1 202 as the root of the subtree, returns C2 206 as the first scoped node. If B2 203 is specified as the root, the function returns null (there are no scoped nodes below B2). If B3 204 is specified, the function returns G1 214.

| Inputs: | |
|---|---|
| root | The node under which the first node in the scope is desired |
| scope | The set of nodes that are in the scope |
| scopeUnder | The set of nodes that are parents of scoped nodes |
| Outputs: | |
| node | The first scoped node according to the definition. |

Method

1. If query(scopeUnder,root) is true [there are scoped nodes under the root]
   a. child=getFirstChild(root)
   b. While child is not null [there are still children to look under]
      1) If query(scope,child) is true [the child is in the scope]
         a) node =child [child is the first scoped node]
         b) return
      2) Otherwise [the child is not in the scope, so find the first scoped node under it]
         a) findFirstScoped(child, scope, scopeUnder, node) [find the first scoped node under the child]
         b) If node is not null [we found a scoped node]
            i. Return [node is the first scoped node under root, so we're done]
         c) Otherwise [didn't find the first node under this child of root]
            i. child=getRightSibling(child) [try next child of root]
   c. node=null [couldn't find a first child anywhere]
   d. Return.
2. Otherwise [there aren't any scoped nodes under this one]
   a. node=null [No first subtree under that node]

II. findNextScoped(root, scope, scopeUnder, prev, node): Given the root of a subtree, a scope set, a scopeUnder set, and a previous node, return the next scoped node under that root.

Assuming the example tree in FIG. 2a, given root B1 202 and the previous node C2 206, the next node is null. Given root B3 204 and previous node G1 214, the next node is G2 216.

| Inputs: | |
|---|---|
| root | The node under which the next node in the scope is desired |
| scope | The set of nodes that are in the scope |
| scopeUnder | The set of nodes that have scoped nodes beneath them |
| prev | The node that we want to find the next scoped node after |
| Outputs: | |
| node | The next scoped node according to the definition |

Method

1. While prev is different from root [there must be something more to search for]
   a. rsib=getRightSibling(prev)
   b. While rsib is not null [there are still siblings to try]
      1. If query(scope,rsib) is true [the sibling is in the scope
         a) node=rsib [sibling is the next scoped node]
         b) Return
      2. Otherwise [the sibling is not in the scope, so find the first scoped node under it]
         a) findFirstScoped(rsib, scope, scopeUnder,node) [find the first scoped node under the sibling]
         b) If node is not null [found a scoped node]
            i. Return [node is the next scoped node under root after prev, so we're done]
         c) Otherwise [didn't find the first node after this sibling of prev]
            i. rsib=getRightSibling(rsib) [try next sibling
   c. prev=getParent(prev) [couldn't find a first child anywhere next to prev, so try prev's parent]
2. node=null [reached root without finding a scoped node, so there can't be any after prev]
3. Return III. getFirstSubtree(root,scope,scopeUnder,compSubtrees, sub,top): Given a root node for a subtree, a scope set, a scopeUnder set, and a completely scoped subtrees set, return a new copy of the first collected subtree formed of all the scoped nodes under root, and the top node identifier in the original tree of the subtree that was copied.

Figure 2B:
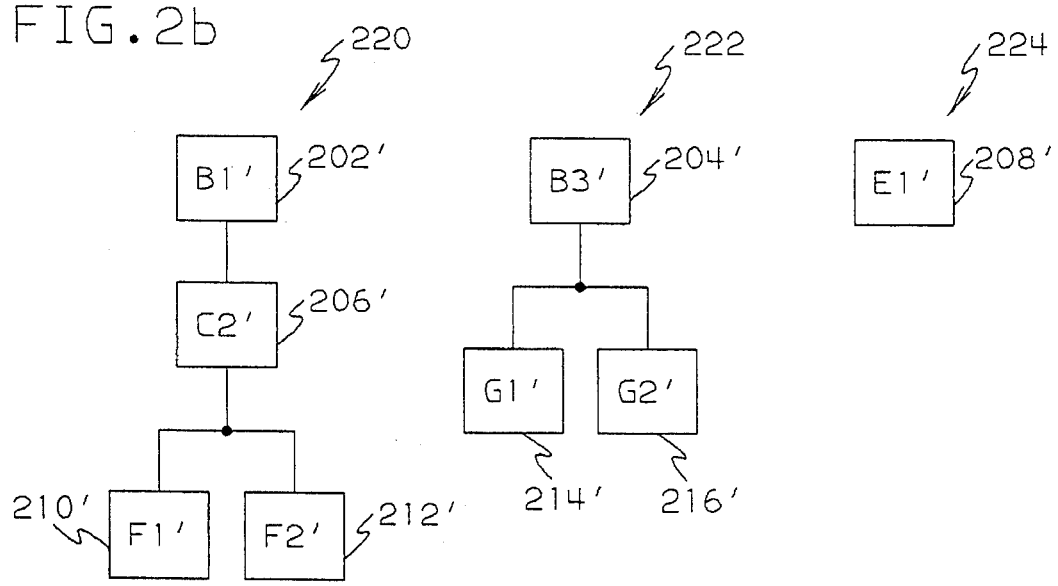

Assuming the example tree in FIGS. 2a and 2b, given B1 202, return the new "sub"tree starting with C2 206' and C2 206.

| Inputs: | |
|---|---|
| root | The node under which the first scoped subtree is desired |
| scope | The set of nodes that are in the scope |
| scopeUnder | The set of nodes that have scoped nodes beneath them. |
| compSubtrees | The set of nodes whose subtrees are made up entirely of scoped nodes. |
| Outputs: | |
| sub | The first new subtree found |
| top | The old node that is the top of the first scoped subtree |

Method 1. findFirstScoped(root,scope,scopeUnder,top) [grab the top of the first subtree]
2. If top is null [didn't find a scoped node, so there can't be any subtrees]
   a. sub=null [no subtree]
   b. Return 3. Otherwise [found a top for the subtree, so collect the subtrees underneath it]
   a. If query(compSubtrees,top) [see if a complete subtree is scoped]
      1) copySubtree(top,sub) [copy a complete subtree]
   b. Otherwise [the entire subtree under top is not scoped. Collect the pieces of the subtree that are scoped]
      1) sub=copyNode(top) [make a new copy of the top scoped node]
      2) create(list) [get a list to collect the subtrees into]
      3) addSubtrees(top, scope, scopeUnder, compSubtrees, list)
      4) If isEmpty(list) [no subtrees to collect]
         a) Return [sub is all the subtree there is]
      5) Otherwise
         a) graft(sub, null, list, status) [put the list of subtrees onto sub as the first bunch]
         b) destroy(list) [don't need the list anymore]
         c) Return IV. getNextSubtree(root,scope,scopeUnder,compSubtrees, Prev,sub, top): Given a root node for a subtree, a scope set, a scopeUnder set, a completely scoped subtrees set, and a previous node identifier return a new copy of the next collected subtree formed of all the scoped nodes under root after prev, and the top node identifier in the original tree of the subtree was copied.

Assuming the example tree in FIGS. 2a and 2b, given B3 as root and G1 214 as prev, the routine returns the new "sub"tree starting with G2 216', and G2 216. Or, given B1 202 as root and C2 206 as prev, the routine returns null as the subtree and as top.

Inputs:

| | |
|---|---|
| root | The node under which the first scoped subtree is desired |
| scope | The set of nodes that are in the scope |
| scopeUnder | The set of nodes that have scoped nodes beneath them |
| compSubtrees | The set of nodes whose subtrees are made up entirely of scoped nodes |
| prev | The node that is the top of the previous subtree |

Outputs:

| | |
|---|---|
| sub | The next new subtree found after prev |
| top | The old node that is the next scoped subtree top after prev |

Method 1. findNextScoped(root, scope,scopeUnder,prev,top) [grab the top of the next subtree]
2. If top is null [didn't find a scoped node, so there can't be any subtrees left]
   a. sub=null[no subtree]
   b. Return
3. Otherwise [found a top for the subtree, so collect the subtrees underneath it]
   a. If query(compSubtrees,top) [see if a complete subtree is scoped]
      1) copySubtree(top,sub) [copy a complete subtree]
   b. Otherwise [the entire subtree under top is not scoped. Collect the pieces of the subtree that are scoped]
      1) sub=copyNode(top) [make a new copy of the top scoped node]
      2) create(list) [get a list to collect the subtrees into]
      3) addSubtrees(top, scope, scopeUnder, compSubtree, list)
      4) If isEmpty(list) [no subtrees to collect]
         a) Return [sub is all the subtree there is]
      5) Otherwise
         a) graft(sub, null, list, status) [put the list of subtrees onto sub as the first bunch]
         b) destroy(list) [don't need the list anymore]
         c) Return V. addSubtrees(root,scope,scopeUnder,compSubtrees, list): Given a root node for a given subtree, a scope set, a scopeUnder set, a completely scoped subtrees set, and a list of subtrees, append to the list the subtrees under root that are collected from the nodes that are scoped.

Assuming the example tree in FIGS. 2a and 2b, given B1 202 and an empty list, the routine returns the list containing the subtree topped by C2 206'. Given B2 203 and an empty list, it returns the empty list. Given B3 204 and an empty list, it returns the list containing G1 214' and G2 216'.

Inputs:

| | |
|---|---|
| root | The node under which the subtrees are to be collected |
| scope | The set of nodes in the scope |
| scopeUnder | The set of nodes that have scoped nodes beneath them |
| compSubtrees | The set of nodes whose subtrees are made up entirely of scoped nodes |
| list | The list to which the new subtrees are added |

Outputs:

| | |
|---|---|
| list | The list to which the new subtrees are added |

Method 1. getFirstSubtree(root, scope, scopeUnder, compSubtrees, sub, top) [grab the top of the first subtree]
2. While sub is not null [there are still some subtrees left]
   a. append(list, sub) [add the subtree to the list]
   b. getNextSubtree(root, scope, scopeUnder, compSubtrees, top, sub, top) [get the next subtrees to add]

VI. buildScopeUnder(scope,scopeUnder): Given a scope set, return the set of nodes that have scoped nodes beneath them.

See the example under findFirstScoped for sample inputs and outputs.

Inputs:

| | |
|---|---|
| scope | The set of nodes that are in the scope |

Outputs:

| | |
|---|---|
| scopeUnder | The set of nodes that have scoped nodes beneath them |

Method 1. node=getFirst(scope) [pick a node from the scope]
2. While node is not null [there are still nodes in the scope]
   a. parent=getParent(node)
   b. While parent is not null and the query(scopeUnder, parent) is not true [there are parents left to add that haven't been added before]
      1) insert(scopeUnder,parent) [add the node to the set]
      2) parent=getParent(parent) [get the next parent to add]

c. node=getNext(scope) [next arbitrary node to pull from the scope]

VII. collectTrees(tree,scope,compSubtrees,list): Given the root node of a complete tree, a set of node identifiers that are in the scope, and a set of completely scoped subtrees, return a list of copied subtrees collected from the nodes in the scope.

Assuming the example tree in FIGS. 2a and 2b, given the tree based off node A1 201, and the set containing B1 202, B3 203, C2 206, E1 208, F1 210, F2 212, G1 214, and G2 216 as the scope, the routine returns the list containing subtrees 202, 222, 224, below nodes B1' 202, B3' 204 and E1' 208, in that order Inputs:

| | |
|---|---|
| tree | The root of the tree from which to collect the subtrees |
| scope | The set of nodes in the scope |
| compSubtrees | The set of nodes whose subtrees are made up entirely of scoped nodes |
| list | The list to which the new subtrees are added |

Method

1. Create(scopeUnder) [create a set to hold the nodes that have a scoped node under them]
2. buildScopeUnder(scope,scopeUnder) [create the scopeUnder set]
3. addSubtrees(tree, scope, scopeUnder, compSubtrees, list) [get the subtrees into the list]

VIII. deleteConnected(node,scope,compSubtrees,list): Given a node that is scoped in a tree, a set of scoped node identifiers, a set of completely scoped subtrees, and a list of subtrees, delete the scoped nodes that are connected to the identified node, and the node itself, return the scope set minus the nodes that were deleted, and append any orphan subtrees to the list (an orphan subtree is a subtree whose parent has been deleted).

Assuming the example tree 200 in FIG. 2a, given node B1 202, the routine deletes B1 202, C2 206, F1 210, and F2 212, and return the list unchanged. Given node B3 204, the routine deletes B3 204, and adds nodes D1 211 and D2 213 to the end of the list.

Inputs:

| | |
|---|---|
| node | The node from which to start deleting |
| scope | The set of nodes in the scope |
| compSubtrees | The set of nodes whose subtrees are made up entirely of scoped nodes |
| list | The list to which are added the subtrees left after the scoped nodes are deleted |

Outputs:

| | |
|---|---|
| scope | The set of nodes in the scope |
| list | The list to which are added the subtrees left after the scoped nodes are deleted |

Method

1. If query(compSubtrees,node) [see if a complete subtree is scoped]
    a. If getFirstChild(node) is null [see if the subtree consists only of the node]
        1) delete(scope, node) [the node has no children. Remove it from the scope using a simple delete]
        2) destroyNode(node)
    b. Otherwise [there is more than one node in the subtree]
        1) create(subtreeNodes) [create a set to hold the nodes in the subtree]
        2) getSubtreeNodes(node, subtreeNodes) [get the set of nodes within the subtree]
        3) difference(scope, subtreeNodes) [remove the nodes from the scope]
        4) destroy(subtreeNodes)
        5) destroySubtree(node) [delete the subtree]
2. Otherwise
    a. delete(scope, node) [remove this node from the scope]
    b. child=getFirstChild(node) [get the child of node]
    c. While child is not null [there are still children left]
        1) If query(scope, child) is true [child is in the scope ]
            a) deleteConnected(child, scope, compSubtrees,list) [recurse to delete the nodes connected to the child and add to list]
        2) Otherwise [child is not in the scope]
            a) append(list,child) [add the leftover node to the leftover node list]
        3) child=getRightSibling(child) [get the next child]
    d. destroyNode(node) [destroy the deleted node]

IX. deleteTrees(tree,scope,compSubtrees): Given the root of an entire tree, a set of scoped node identifiers to attempt to delete, and a set of completely scoped subtrees, delete the nodes identified in the scope set from the tree, and return the empty set.

Inputs:

| | |
|---|---|
| tree | The root of the tree from which to delete |
| scope | The set of nodes in the scope |
| compSubtrees | The set of nodes whose subtrees are made up entirely of scoped nodes |

Outputs:

| | |
|---|---|
| scope | The set of nodes that are left in the scope (none following a delete) |

Method 1. create(orphanList) [create the list for the children of deleted nodes]
2. While isEmpty(scope) is not true [there are still nodes to delete]
    a. node=getFirst(scope) [get a node to start with]
    b. parent=getParent(node) [get the parent node]
    c. While parent is not null and then query(scope, parent) is true [ascend to top of nodes to delete]
        1) node=parent [node wasn't the topmost]
        2) parent=getParent(node)
    d. If parent is null [the root was scoped and to be deleted]
        1) Fail [it is illegal to delete the root, so fail]
    e. lastToReplace=getLastChild(parent)
    f. while not query(scope, lastToReplace) [find the last child that is scoped]
        1) lastToReplace=getLeftSibling(lastToReplace)
    g. firstToReplace=getFirstChild(parent)
    h. while not query(scope, firstToReplace) [find the first child that is scoped]
        1) firstToReplace= getRightSibling(firstToReplace)
    i. child=firstToReplace
    j. prevChild=null
    k. While prevChild not lastToReplace [loop through the range between the first scoped child and the last scoped child of parent. Delete nodes in scope and collect orphaned subtrees that must be adopted by parent]
  1) if query(scope,child) [see if the child is scoped]
     a) deleteConnected(child, scope, compSubtrees,orphanList) [delete scoped nodes under child and including child. Collect orphaned subtrees]
  2) Otherwise [the child is not scoped]
     a) append(orphanList,child) [add the child to the list of nodes that will replace the range of nodes between firstToReplace and lastToReplace]
  3) prevChild=child
  4) child=getRightSibling(child)
l. replace(parent, firstToReplace, lastToReplace, orphanList, status) [replace the nodes between firstToReplace and lastToReplace with the nodes in orphanList]
m. makeEmpty(orphanList) [clean up the list of orphans]
3. destroy(orphanList)

X. removeScoped(root, scope, scopeUnder, compSubtrees, unremovedList): Given a scoped root node for a given subtree, a scope set, a scopeUnder set, a completely scoped subtrees set, and a list of unremoved subtrees, append to the list of unremoved subtrees any subtrees under root which are not removed, and remove all scoped nodes under root from the tree 200.

Assuming the example tree in FIG. 2a, given B1 202 and an empty unremoved list, the routine returns C1 207 in the unremoved list and removes B1 202, C2 206, F1 210, and F2 212. Given B3 204 and an empty removed list, it returns D1 211 and D2 213, and removes B3 204, G1 214, and G2 216.

Inputs:

| | |
|---|---|
| root | The node under which scoped nodes are to be removed |
| scope | The set of nodes that are in the scope |
| scopeUnder | The set of nodes that have scoped nodes beneath them |
| compSubtrees | The set of nodes whose subtrees are made up entirely of scoped nodes |
| unremovedList | The list to which unremoved subtrees are added |

Outputs:

| | |
|---|---|
| scope | The set of nodes in the scope |
| unremovedList | The list to which the new unremoved subtrees have been added |

Method

1. Ifquery(compSubtrees, root) [see if the entire subtree is scoped. If so, only update the scope]
   a. if getFirstChild(root) is null [see if the subtree consists only of root]
      1) delete(scope, root) [the root has no children. Remove it from the scope using a simple delete]
   b. Otherwise [there is more than one node in the subtree]
      1) create(subtreeNodes) [create a set to hold the nodes in the subtree]
      2) getSubtreeNodes(root, subtreeNodes) [get the set of nodes within the subtree]
      3) difference(scope, subtreeNodes) [remove the nodes from the scope]
      4) destroy(subtreeNodes)
2. Otherwise
   a. delete(scope, root) [remove this node from the scope]
   b. create(removedList) [create a list that will hold subtrees that have been removed under root. After these subtrees have been collected, they will be connected to root]
   c. lastToReplace=getLastChild(root)
   d. while lastToReplace not null and then query(scope, lastToReplace) [find the last child that is not scoped]
      1) lastToReplace=getLeftSibling(lastToReplace)
   e. If lastToReplace not null [lastToReplace will be null if all children are scoped, in which case, no children will be replaced]
      1) firstToReplace=getFirstChild(root)
      2) while query(scope, firstToReplace) [find the first child that is not scoped]
         a) firstToReplace= getRightSibling(firstToReplace)
   f. child=getFirstChild(root)
   g. replaceRange=false
   h. While child not null
      1) If query(scope, child) [see if child scoped]
         a) removeScoped(child, scope, scopeUnder, compSubtrees, unremovedList) [recurse to remove connected scoped nodes]
         b) If replaceRange=true [see if within the range of children that are being replaced]
            i. append(removedList, child) [the child should be connected to root when all done. Add it to the list of children that will be reconnected]
      2) Otherwise
         a) if child=lastToReplace
            i. replaceRange=false [no longer in the range of children that will be replaced]
         b) Otherwise
            i. replaceRange=true [in the range of children that needs to be replaced]
         c) If query(scopeUnder, child) [see if descendants of child are scoped]
            i. removeSubtrees(child, scope, scopeUnder, compSubtrees, removedList) [remove scoped nodes and collect removed subtrees to be connected to the root]
         d) append(unremovedList, child) [since the child isn't removed, add it to the list of unremoved subtrees]
      3) child=getRightSibling(child) [handle next child]
   i. If lastToReplace not null [only do the replace if root has at least one unscoped child]
      1) replace(root, firstToReplace, lastToReplace, removedList) [replace the children of root with the list of removed nodes, thus creating a removed subtree]
   j. destroy(removedList)

XI. removeimmediate(root, firstScopedChild, scope, scopeUnder, compSubtrees, list): Given an unscoped root node that has scoped children, the first scoped child of the root, a scope set, a scopeUnder set, a completely scoped subtrees set, and a list of subtrees, append to the list the subtrees under root that are collected from scoped nodes below and to the right of the first scoped child, and remove the scoped nodes from under root.

Assuming the example tree 200 in FIG. 2, given A1 201, B1 202 and an empty list, the routine returns the list containing B1 202, B3 204, and E1 208, and delete B1 202, B3 203, C2 206, E1 208, F1 210, F2 212, G1 214, and G2 216. Given D2 213, G1 214 and an empty list, return the list containing G1 214 and G2 216, and delete G1 214 and G2 216 from the tree.

| | |
|---|---|
| Inputs: | |
| root | The node from under which the subtrees are to be removed |
| firstScopedChild | The firstScopedChild below root that is scoped |
| scope | The set of nodes that are in the scope |
| scopeUnder | The set of nodes that have scoped nodes beneath them |
| compSubtrees | The set of nodes whose subtrees are made up entirely of scoped nodes |
| list | The list to which the new subtrees will be added |
| Outputs: | |
| scope | The set of nodes that are in the scope |
| list | The list to which the new subtrees have been added |

Method 1. create(unremovedList) [create a list which will hold subtrees that will not be removed from the tree, but that must be collected]
2. lastToReplace=getLastChild(root)
3. while not query(scope, lastToReplace) [find the last child that is scoped]
   a. lastToReplace=getLeftSibling(lastToReplace)
4. child=firstScopedChild
5. replaceRange=false
6. while child not null [loop through children. Remove scoped nodes under each child]
   a. If query(scope, child) [child is scoped?]
      1) if child=lastToReplace
         a) replaceRange=false [no longer in the range of children that will be replaced]
      2) Otherwise
         a) replaceRange=true [in the range of children that needs to be replaced]
      3) removeScoped(child, scope, scopeUnder, compSubtrees, unremovedList) [remove the scoped node, and all of its scoped descendants. Append all unremoved subtrees to the list]
      4) append(list,child) [add child to the list of removed subtrees]
   b. Otherwise
      1) If query(scopeUnder, child) [child has scoped descendants?]
         a) removeSubtrees(child, scope, scopeUnder, compSubtrees, list) [remove the scoped descendants]
      2) If replaceRange=true [see if in the range of children that is being replaced]
         a) append(unremovedList, child) [reinsert this child under the parent once done removing children]
   c. child=getRightSibling(child) [handle next child]
7. replace(root, firstScopedChild, lastToReplace, unremovedList) [replace the range of children which contained scoped children with all unremoved subtrees from that range]
8. destroy(unremovedList)

XII. removeSubtrees(root, scope, scopeUnder, compSubtrees, list): Given an unscoped root node for a given subtree, a scope set, a scopeUnder set, a completely scoped subtrees set, and a list of subtrees, append to the list the subtrees under root that are collected from scoped nodes, and remove the scoped nodes from under root.

Assuming the example tree 200 in FIG. 2, given B2 203 and an empty list, the routine returns an empty list. Given D2 213 and an empty list, it returns a list containing G1 214 and G2 216, and deletes G1 214 and G2 216 from the tree.

| | |
|---|---|
| Inputs: | |
| root | The node from under which the subtrees are to be removed |
| scope | The set of nodes that are in the scope |
| scopeUnder | The set of nodes that have scoped nodes beneath them |
| compSubtrees | The set of nodes whose subtrees are made up entirely of scoped nodes |
| list | The list to which the new subtrees will be added |
| Outputs: | |
| scope | The set of nodes that are left in the scope (none following a remove) |
| list | The list to which the new subtrees have been added. |

Method 1. getFirstScoped(root, scope, scopeUnder, top) [grab the top of the first subtree]
2. While top is not null [there are still some subtrees left]
   a. parent=getParent(top)
   b. removeImmediate(parent, top, scope, scopeUnder, compSubtrees, list) [remove remaining scoped descendants of parent and update list]
   c. Otherwise
      1) getNextScoped(root, scope, scopeUnder, parent, top) [get the next subtree to add, start searching at parent because top (along with all other scoped descendants of parent) was removed]

XIII. removeTrees(tree, scope, compSubtrees, list): Given the root of an entire tree, a set of node identifiers to try to remove, and a set of completely scoped subtrees, return a list of subtrees collected from scoped nodes, and delete the scoped nodes from the tree. removeTrees performs the same function as a call to collectTrees followed by a call to deleteTrees, but removeTrees is more efficient.

Assuming the example tree 200 in FIG. 2, given the tree based off A1 201, and the set containing nodes B1 202, B3 204, C2 206, E1 208, F1 210, F2 212, G1 214, and G2 216 as the scope, the routine returns the list containing subtrees C2 206, B3 203, and E1 208, in that order, and delete B1 202, B3 204, C2 206, E1 208, F1 210, F2 212, G1 214, and G2 216 from the tree.

| | |
|---|---|
| Inputs: | |
| tree | The root of the tree from which to remove trees |
| scope | The set of nodes that are in the scope |
| compSubtrees | The set of nodes whose subtrees are made up entirely of scoped nodes |
| Outputs: | |
| scope | The set of nodes that are left in the scope (none following a remove) |
| list | The list of subtrees removed from the tree |

Method 1. create(scopeUnder) [create a set to hold the nodes that have a scoped node under them]
2. buildScopeUnder(scope, scopeUnder) [create the scopeUnder set]

3. if query(scope,tree)[see if the top node is scoped]
   a. parent=getParent(tree) [the node is scoped. Get its parent]
   b. if parent is null [see if the tree is the root]
      1) Fail [cannot remove the root]
   c. create(unremovedList)
   d. removeScoped(tree, scope, scopeUnder, compSubtrees, unremovedList) [remove the top node and its scoped descendants, and return the list of unremoved subtrees]
   e. replace(parent, tree, tree, unremovedList, status) [replace tree with the unremoved subtrees]
   f. append(list, tree) [put tree in the list of removed subtrees]
   f. destroy(unremovedList)
4. Otherwise
   a. removeSubtrees(tree, scope, scopeUnder, compSubtrees, list) [the top node is not scoped. Remove the subtrees and put then into the list]

XIV. insertLeft(node,list): Insert a list of subtrees to the left of a given node in a tree.

| Inputs: | |
|---|---|
| node | The node to insert to the left of |
| list | The list of subtrees to insert |

Method 1. parent=getParent(node) [find the parent of the node]
2. prev=getLeftSibling(node) [determine node after which to insert]
3. graft(parent,prev,list,status) [insert the trees]

XV. insertRight(node,list): Insert a list of subtrees to the right of a given node in a tree.

| Inputs: | |
|---|---|
| node | The node to insert to the right of |
| list | The list of trees to insert |

Method 1. parent=getParent(node) [find the parent of the node]
2. graft(parent,node,list,status) [insert the trees]

XVI. insertAround(node,list): Insert a list of subtrees as a child of the parent of a given node with that node as a child of one of the leaves of one of the subtrees in the list. The leaf chosen is the first leaf into which the given node fits.

| Inputs: | |
|---|---|
| node | The node to insert around |
| list | The list of trees to insert |

Method 1. parent=getParent(node) [find the parent of the node]
2. prev=getLeftSibling(node) [determine node after which to insert]
3. create(childList) [dummy list for grafting]
4. append(childList,node) [store node for later graft]
5. replace(parent,node,node,list, status) [remove the node and replace it with the list]

6. tree=getFirst(list)
7. while tree is not null [iterate through the trees in the list]
   a. leaf=getFirstLeaf(tree)
   b. while leaf is not null [iterate through the leaves on the tree]
      1) graft(leaf,null,childList,status)
      2) If status=ok
         a) return [successful insert around]
      3) left=getNextLeaf(tree,leaf) [try next leaf]
   c. tree=getNext(list,tree) [try next tree]
8. fail [no more trees to try, unsuccessful]

XVII. insertWithin(node,list): Insert a list of subtrees as the children of a given node with the children of that node as the children of one of the leaves of one of the subtrees in the list. The leaf chosen is the first leaf into which the children fit.

| Inputs: | |
|---|---|
| node | The node to insert within |
| list | The list of trees to insert |

Method 1. parent=node [find the parent to insert within]
2. create(childList)
3. node=getFirstChild(node) [find out the first child]
4. While node is not null [scan through children]
   a. append(childList,node) [remember child]
   b. node=getRightSibling(node) [next child]
5. replace(parent, getFirstChild(parent), getLastChild(parent), list, status) [replace all of the children with the list]
6. tree=getFirst(list)
7. While tree is not null [iterate through the trees in the list]
   a. leaf=getFirstLeaf(tree)
   b. while leaf is not null [iterate through the leaves on the tree]
      1) graft(leaf,null,childList,status)
      2) If status=ok
         a) Return [successful insert within]
      3) leaf=getNextLeaf(tree,leaf) [try next leaf]
   c. tree=getNext(list,tree) [try next tree]
8. fail [no more trees to try, unsuccessful]

XVIII. insertTrees(node,relation,list): Given a target node, a relation to that target node, and a list of subtrees to insert, insert the subtrees in relation to the target node.

| Inputs: | |
|---|---|
| node | The node to insert within |
| relation | The target relation to the node |
| list | The list of trees to insert |

Method

1. Case relation of
   a. left
      1) insertLeft(node,list)
   b. right
      1) insertRight(node.list)
   c. around
      1) insertAround(node,list)
   d. within
      1) insertWithin(node,list)

XIX. checkcompSubtree(node, scope, compSubtrees, alreadyChecked): Given a node, a scope set, a set of nodes which are already known to have completely scoped subtrees, and a set of nodes which have already been checked for completed scoped subtrees, indicate if the subtree under the node is made up entirely of scoped nodes.

| Inputs: | |
| --- | --- |
| node | The root of the subtree that is to be checked |
| scope | The set of nodes in the scope |
| compSubtrees | The set of nodes already known to have subtrees made up entirely of scoped nodes. |
| alreadyChecked | The set of nodes within scope which have already been checked by checkCompSubtree |
| Outputs: | |
| compSubtrees | The set of nodes which are known to have subtrees made up entirely of scoped nodes. |
| alreadyChecked | The set of nodes within scope which have been checked by checkCompSubtree |

Method

1. If query(scope,node) [see is node is in the scope]
    a. if query(alreadyChecked,node) [see if checkCompSubtree has already checked this node]
        1) return
    b. Insert(alreadyChecked,node) [add node to the set of nodes checkCompSubtree has checked]
    c. child=getFirstChild(node)
    d. While child is not null [loop while there are still children of node]
        1) checkCompSubtree(child, scope, compSubtrees,AlreadyChecked) [check to see if the subtree under child is entirely scoped, and add node to compSubtrees if it is]
        2) not query(compSubtrees,child)
            a) return
        3) child=getRightSibling(child) [check next child]
    e. insert(compSubtrees,node) [since the node is scoped, and all its children subtrees are scoped, the node's subtree is scoped]

XX. buildcompSubtrees(scope, compSubtrees): Given a scope set, return the set of nodes which are the roots of subtrees made up entirely of scoped nodes. Determine which subtrees are entirely scoped because the collectTrees, removeTrees and deleteTrees operations can take shortcuts when working with complete subtrees.

Assuming the example tree 200 in FIG. 2, this set of nodes contains C2 206, F1 210, F2 212, G1 214, G2 216 and E1 208.

| Inputs: | |
| --- | --- |
| scope | The set of nodes in the scope |
| Outputs: | |
| compSubtrees | The set of nodes whose subtrees are made up entirely of scoped nodes. |

Figure 11:
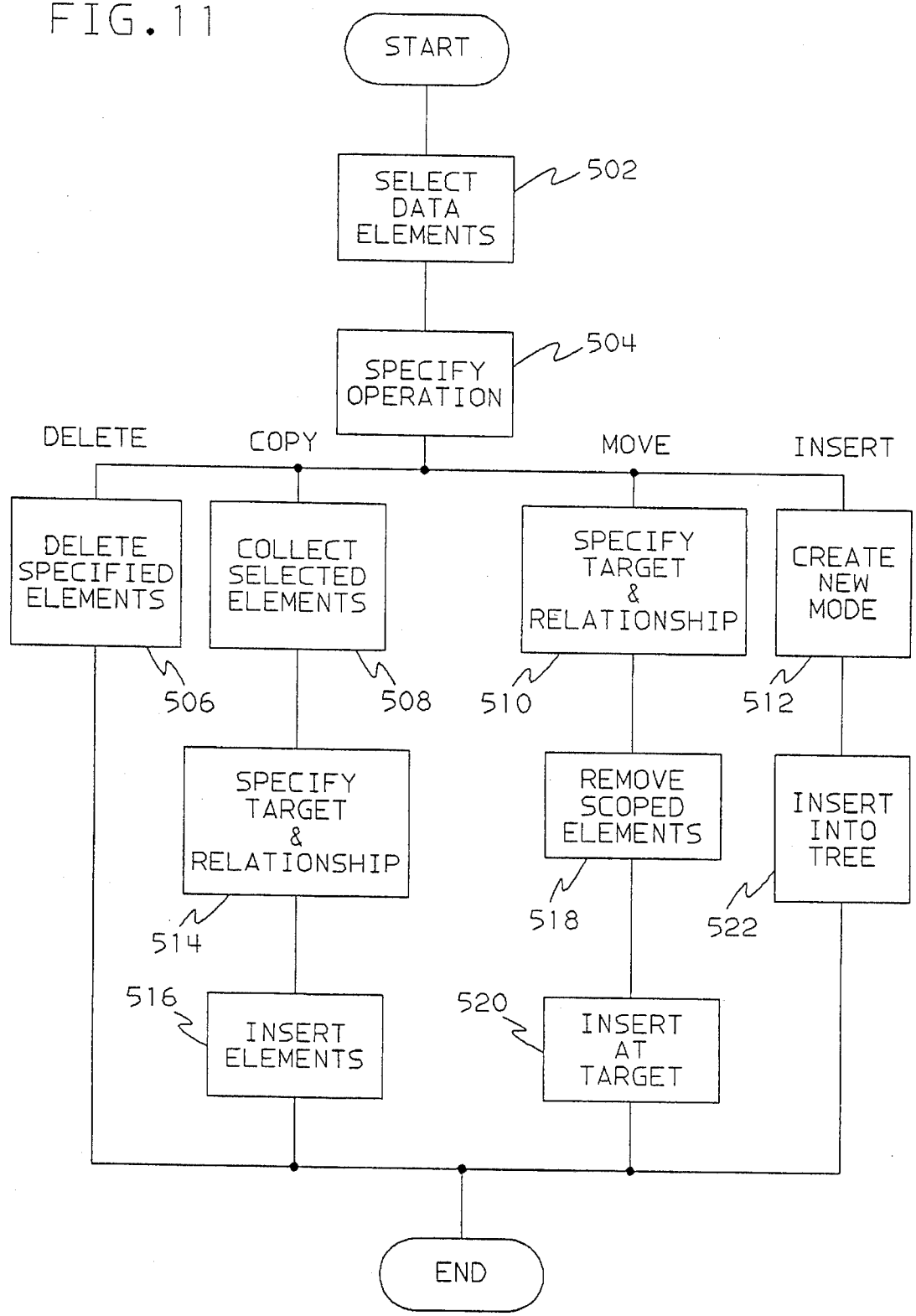
FIG. 11 is a flowchart depicting the basic process flow of the preferred embodiment of the present invention.

Method 1. create(alreadyChecked) [Initialize set of nodes that have been checked for complete subtrees]
2. node=getFirst(scope) [pick a node from the scope]
3. While node is not null [loop while there are still nodes in the scope]
    a. checkCompSubtree(node,scope,compSubtrees, alreadyChecked) [check to see if the subtree under node is completely scoped, and add node to compSubtrees if it is]
    b. node=getNext(scope) [next arbitrary node to pull from the scope]
4. destroy(alreadyChecked)
5. Main Functions The following functions are defined using the preceding subroutines. These functions provide the high level view of the generalized structure editing operations: delete; copy; move; insert. FIG. 11 illustrates the process flow described below. The discussion concentrates on the processes for manipulating the data; the user interaction required to specify the scope 502, type of operation 504, target node, and relationship to the target node are not discussed.

A. Delete(tree,scope): Delete a scope from a tree (Step 506).

| Inputs: | |
| --- | --- |
| tree | The root of the tree to start deleting |
| scope | The set of nodes in the scope |
| Outputs: | |
| scope | The set of nodes that are left in the scope [none following a delete] |

Method 1. create(compSubtrees) [create set for nodes whose subtrees are completely scoped]
2. buildCompSubtrees(scope, compSubtrees) [build the set of nodes whose subtrees are completely scoped]
3. deleteTrees(tree, scope, compSubtrees) 506 [delete the trees]
4. destroy(compSubtrees)

B. Copy(tree,scope,node,relation): Copy a scope to a target location (Steps 508, 514, 517).

| Inputs: | |
| --- | --- |
| tree | The root of the tree from which to start deleting |
| scope | The set of nodes in the scope |
| node | The target node |
| relation | The target relation to the node |
| Outputs: | |
| scope | The set of nodes that are left in the scope [none following a copy] |

Method 1. create(treeList) [the list of trees that make up the scope]
2. create(compSubtrees) [create set for nodes whose subtrees are completely scoped]
3. buildCompSubtrees(scope, compSubtrees) 508 [build the set of nodes whose subtrees are completely scoped]
4. collectTrees(tree, scope, compSubtrees, treeList) 514 [collect the subtrees that are scoped]
5. insertTrees(node, relation treeList) 516 [insert the collected trees at the target]
6. makeEmpty(scope) [clear scope]
7. destroy(compSubtrees)
8. destroy(treeList)

C. Move (tree,scope,node,relation): Move a scope to a target location (Steps 510, 518, 520).

| Inputs: | |
|---|---|
| tree | The root of the tree from which to start deleting |
| scope | The set of nodes in the scope |
| node | The target node |
| relation | The target relation to the node |
| Outputs: | |
| scope | The set of nodes left in the scope [none following a move] |

Method 1. create(treeList) [the list of trees that make up the scope]
2. create(compSubtrees) [create set for nodes whose subtrees are completely scoped]
3. buildCompSubtrees(scope, compSubtrees) 510 [build the set of nodes whose subtrees are completely scoped]
4. removeTrees(tree, scope, compSubtrees, treeList) 518 [collect the subtrees that are scoped, and delete them from the tree]
5. insertTrees(node, relation, treeList) 520 [insert the collected subtrees at the target]
6. destroy(compSubtrees)
7. destroy(treeList)

D. Insert(tree,node,relation,nodeType): Insert a new node of a given type at a target location (Steps 512, 522).

| Inputs: | |
|---|---|
| tree | The root of the tree to start deleting from |
| node | The node to insert within |
| relation | The target relation to to the node |
| nodeType | The type of node to create |

Method 1. create(treeList) [the list of trees that make up the scope]
2. createNode(newNode,nodeType) 512 [create the node with the appropriate type]
3. append(treeList,newNode]
4. insertTrees(node,relation,treeList) 522
5. destroy(treeList)
6. Extension to Preferred Embodiment Although many editing systems for manipulating tree structured data have been developed, the inventors are aware of no prior art for manipulating n-ary trees and enforcing syntax rules on such a tree. This extension of the preferred embodiment will now be described.

In the prior art, trees manipulated by syntax directed editors take the form of a direct rendition of the Backus Naur Form (BNF) structure into an internal tree. BNF is a means of specifying the valid relationships within a set of data. BNF was developed to define the legitimate sequences that could be recognized as belonging to some language. The use of trees to represent intermediate stages of parsing the language came later.

BNF consists of rules known as productions. Each production has a left-hand side and a right-hand side, separated by some delimiter, commonly an arrow or the string "::=". The left-hand side consists of a single word. (This is not always the case. The most general description of BNF allows for sequences on both sides of the production. This feature is considered to be too difficult to use in real systems, however, and is unnecessary for formal languages such as programming languages.) This word is a non-terminal. The right-hand side consists of a sequence of zero or more words, which may be non-terminals or terminals. Terminal words never appear on the left-hand side of productions. If a node in the tree is generated for each non-terminal word, then the right-hand sides of productions having that non-terminal as its left-hand side define the legitimate children for that node.

A non-terminal word may appear as the left-hand side of more than one production. The right-hand sides do not have to be equivalent in this case. This means that a single type of node may have different types of children at different times.

A non-terminal word may appear in both the left- and right-hand sides of a production, or more deeply nested within the dependencies of the grammar. This recursion is the way that sequences are expressed in BNF. For example, statements::=statement statements::=statements statement statement::=ifStatement statement::=whileStatement ifStatement::='IF' condition 'THEN' statement ifStatement::='IF' condition 'THEN' statement 'ELSE' statement whileStatement::='WHILE' condition 'DO' statements 'END' defines a sequence a statements recursively. Note that the sequence of statements defined here may not be zero length.

It is inefficient to write the rules for a complete language in simple BNF. BNF is commonly extended to allow for a concise expression of the rules. The extensions include the use of a vertical bar, "|", to indicate a choice amongst terminals and non-terminals, square brackets, "[]", to indicate optional terminals or non-terminals, and curly braces, "{}", to indicate a 0 to n length sequence of terminals or non-terminals (where n is any positive integer). Definitions of the exact meaning of these extensions differ from implementation to implementation. As an example, the six productions above can be replaced by:

statements::=statement {statement} statement::=ifStatement | whileStatement ifStatement::='IF' condition 'THEN' statement ['ELSE' statement]

whileStatement::='WHILE' condition 'DO' statements 'END'

These extensions do not extend the expressive power of BNF, but merely make it more convenient to write. The transformation from these extensions to simple BNF is trivial. For this reason, extensions to BNF are colloquially known as "syntactic sugar," because they make the syntax of BNF easier to swallow.

Figure 5:
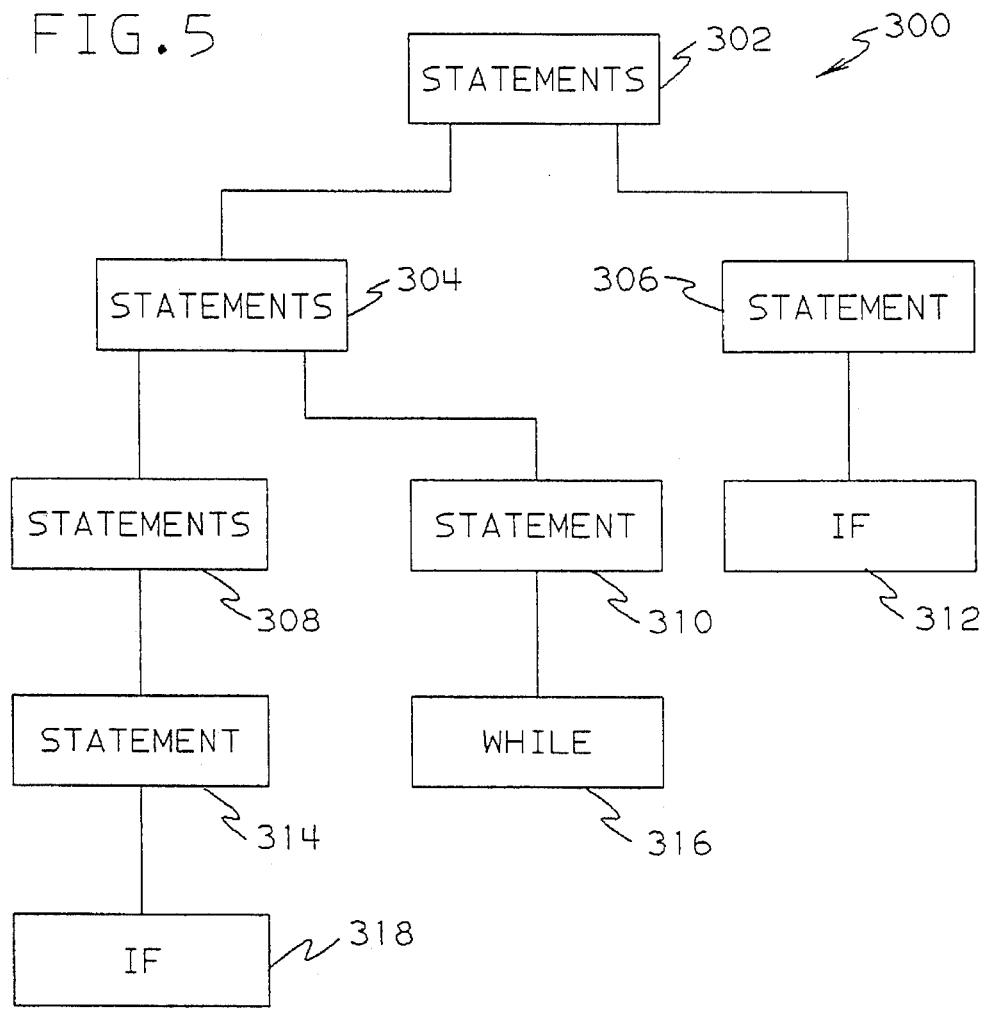
FIG. 5 shows a parse tree representing an exemplary valid sequence of statement using simple Backus Naur Form structure.

A tree built in such a way that each and every node in the tree represents a specific instance of some production in simple BNF is known as a parse tree. A parse tree representing a valid sequence of statements using the simple grammar presented herein is shown generally at 300 (e.g. 304, 306, 308, 310, 312, 314) in FIG. 5.

Note the number of intermediate nodes used. In the prior art of which the inventors are aware, trees manipulated by syntax directed editors take the form of a direct rendition of the simple BNF structure into an internal tree. This requires each type of node in the tree to have a fixed number of children.

Figure 6:
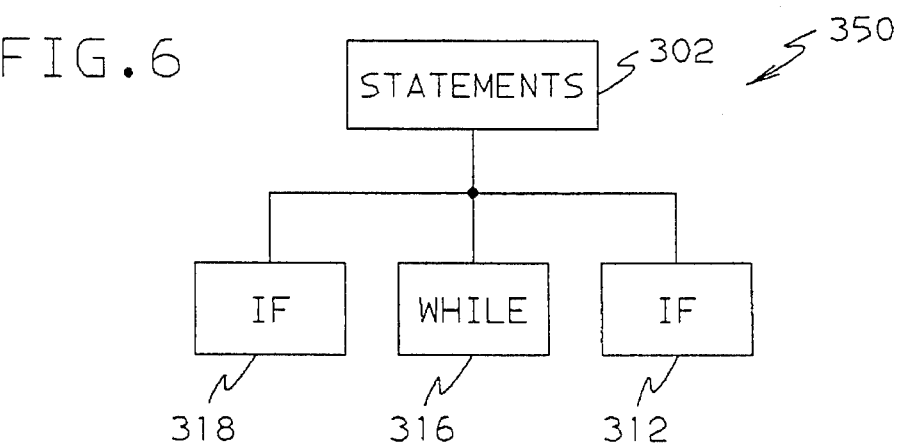
FIG. 6 is an improved representation of the tree shown in FIG. 5, using extended BNF.

The preferred embodiment of the present invention allows nodes to have a variable number of children, and removes the need for intermediate nodes by maintaining the tree in a form that is directly equivalent to the extended BNF. In addition, certain nodes that are intermediates in the extended BNF need not be present in the tree. Using this improved tree representation, the previous simple grammar can be represented as shown generally at 350 in FIG. 6.

Note that many fewer nodes are required for this representation. The more nodes employed as intermediate "backbones" to sequences, the less storage available for the data that users of syntax-directed editors are interested in, i.e. the lowest level statements themselves. In addition, in large, complex languages such as Ada programming language, the number of intermediate productions needed to define common language constructs is quite large. The manipulation of all these nodes takes time resulting in an editor with slow response times to user actions.

The basic concept behind this extension to the preferred embodiment, i.e., a method of maintaining syntactic correctness in a structure editor (thus making it a syntax-directed editor), is the use of "sockets". A socket defines the types of nodes and relationships that can be associated with a given node.

This embodiment maintains an n-ary tree representing the data and relationships: In other words each node may have an arbitrary number of other nodes related to it. Each node (or more precisely, each type of node) has a fixed number of sockets or allowable relations. However, any number of nodes satisfying the socket criteria may be associated with the given node via that socket.

The following example grammar will be used to help explain the concept socket 'I', '[]' and '{}' mean the same thing in this grammar as they do in extended BNF. Since this grammar is only used for tree manipulation, non-terminals are not shown.

```
block            ::= {DECLARE} {statement}
DECLARE          ::= VARPART TYPEPART
VARPART          ::=
TYPEPART         ::=
statement        ::= IFSTATEMENT |
                     WHILESTATEMENT
IFSTATEMENT      ::= CONDITION THENPART
                     [ELSEPART]
CONDITION        ::=
THENPART         ::= {statement}
ELSEPART         ::= {statement}
WHILESTATEMENT   ::= CONDITION nullorblock
nullorblock      ::= NULLSTATEMENT | block
NULLSTATEMENT    ::=
```

Each right hand side non-terminal word represents a socket associated with the left hand side. Each socket has two attributes defined in a language definition table. The two attributes are the socket type, which determines how many nodes may connect to it, and the connection rule for that socket, which determines which other node types may connect to that socket. All nodes of a node type (defined by a left-hand side) share the same definitions of their sockets.

The valid types for sockets are:

| | |
|---|---|
| required | Nodes matching the connection rule must be connected to the socket at all times. Required sockets are represented in the grammar as right hand side non-terminal words with no '{ }' or '[ ]' around them. For example, the DECLARE production has two required sockets, VARPART and TYPEPART. |
| optional | Nodes matching the connection rule may be connected to the socket, or it may be empty. There can be at most one set of connections made to an optional socket. Optional sockets are represented in the grammar as right hand side non-terminals with '[ ]' around them. For example, the IFSTATEMENT production has an optional socket, [ELSEPART]. |
| n-ary | Nodes matching the connection rule may be connected to this socket, or it may be empty. There is no limit to the number of sets of connections which can be made to an n-ary socket. N-ary sockets are represented in the grammar as right hand side non-terminals with '{ }' around them. For example, the block production has two n-ary sockets, {DECLARE} and {statement}. |

Figure 7:
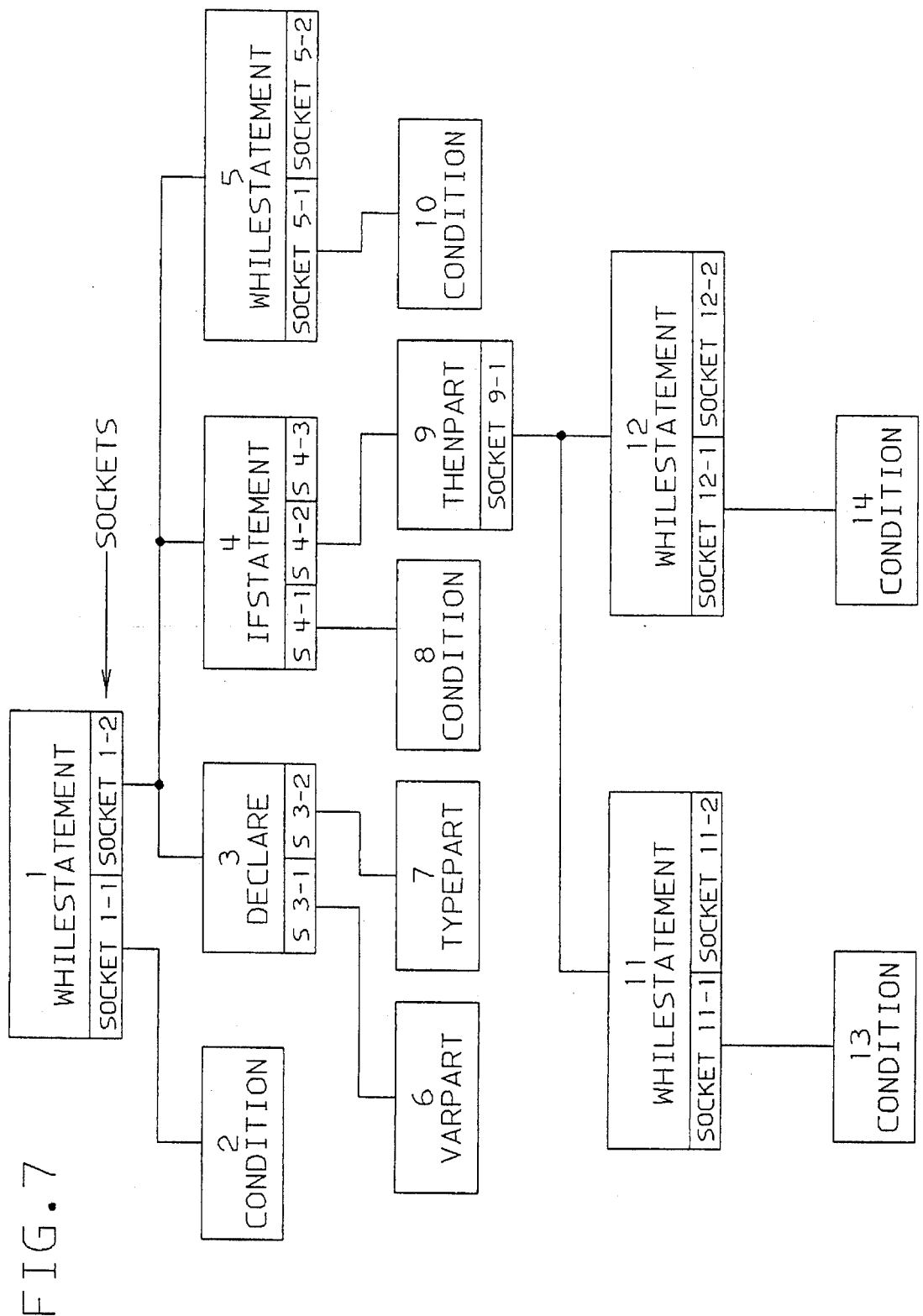
FIG. 7 is a tree structure illustrating the concept of "sockets".

Each socket has a single connection rule attribute determined by the production which defines the non-terminal word represented by the socket. The connection rule defines the nature of the connections allowed. There are only four types of connection rules, two simple types and two complex types. The simple types are:

| | |
|---|---|
| construct | Construct rules define the basic language constructs, i.e. words or phrases that would appear during the use of the language, as contrasted with definitions of language abstractions or intermediate definitions. Construct rules are defined by the language specification. Construct rules are the only rules that define nodes actually represented in a tree. In the example grammar, construct rules are identified by uppercase non-terminal words (DECLARE, VARPART, TYPEPART, . . .) When a socket contains a construct connector rule name, it means that a node defined by a construct connector rule should be inserted under the socket. For example the IFSTATEMENT node contains three sockets with construct connection rules, one for CONDITION, one for THENPART, and an optional one for ELSEPART. (Node 4 of FIG. 7 is an IFSTATEMENT and contains three sockets 4-1, 4-2, and 4-3.) The type of a node is given the same name as the construct rule that defines its structure. For example, a node defined by the IFSTATEMENT rule has a node type of IFSTATEMENT. |
| connectorSet | A connector set rule allows a node of one of many connection rule types to connect to a socket. (Note that if the socket has type required or optional then the maximum number of nodes that may ever be connected to that socket is one, not one of each kind.) Connector set rules appear in the example grammar as: lhs ::= rh1 | rh2 | rh3 | rh4 | . . . where all the "rhx"s are single required sockets having a construct rule type. In the example grammar, the only connector set is 'statement'. 'nullorblock' is not a connector set because 'block' is not a construct rule. 'block' is not a connector set because it has more than one socket on its right hand side, because 'DECLARE' and 'statement' are not required sockets, and because 'statement' is not a construct rule. Connector sets can be implemented in the language definition tables as a bit array containing bit positions for each construct rule by assigning each construct rule an integer value. A one is placed in the respective bit position for each construct rule that the connector set rule references, and other bits are set to 0. The parsing algorithm can then check whether a given construct rule is within a connector set by doing a very rapid bit array lookup. Connector sets represent language abstractions or intermediate nodes in standard BNF. |

Complex connection rule types are more costly to process during editing. However, they are much rarer in language definitions. The two preceding rules are quite efficient, and cover over 90% of the cases in real languages. In a test case grammar for a language similar to the Ada Programming Language, 97% of the connection rules were construct rules or connector set rules. When these simple rule types are used with the methods described below, child nodes can be grafted into a parent node with very few table lookups per child node.

The following complex connection rule types provide a mechanism for nested sockets within a single socket. These connection rules define a fairly standard parser, with the different rule types allowing different efficiencies to be obtained.

| | |
|---|---|
| connector | A connector is similar to a connector set, except that matching connection rule types are not limited to construct rules. Like connector set rules, connector rules appear in the example grammar as:<br>lhs ::= rh1 ! rh2 ! rh3 ! rh4 ! . . .<br>The difference is that each "rhx" does not have to be a single required socket with a construct rule. It can also be a sinqle required socket having a connection rule type of connector set, connector, or ordered connector. In the example grammar, 'nullorblock' is a connector rule. |
| ordered connector | An ordered connector rule divides a socket into subsockets. Each subsocket may be of any type and have any type of connection rule. The '!' BNF symbol is not allowed in the ordered connector rules, i.e. there may not be alternative definitions of subsets. In the example grammar, 'block' is an ordered connector rule. |

The methods of the present invention define how these construction rules may be maintained through editing operations involving graft and replace, which use lists or ranges of subtrees.

The following examples show the results of a graft operation and a replace operation. The examples are based on the example grammar with the initial tree represented as shown in FIG. 7.

Figure 8:
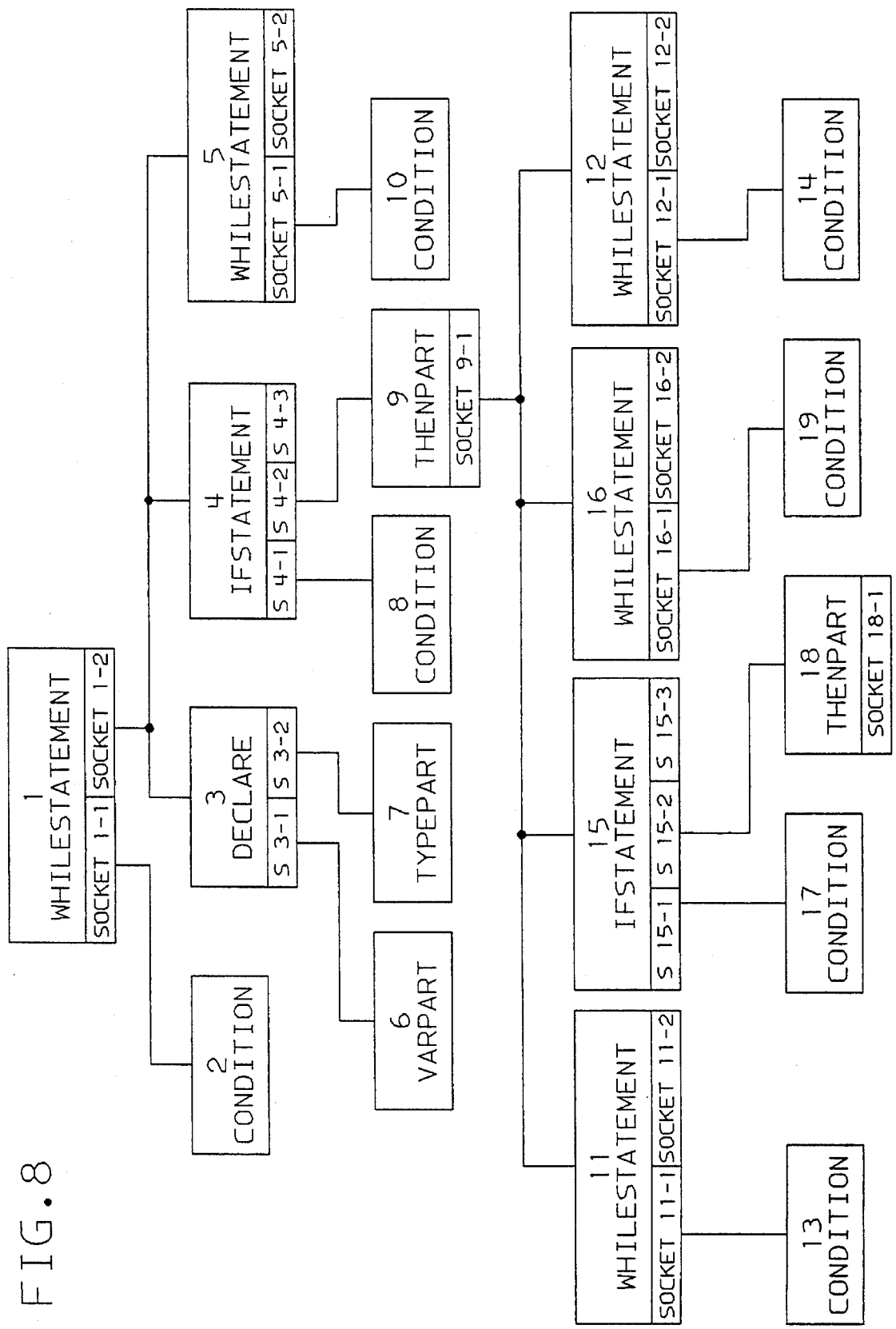
FIG. 8 is a tree like that shown in FIG. 7, after an exemplary graft operation.

Starting with this tree, a list containing an IFSTATEMENT and a WHILESTATEMENT is grafted under node 9 and after node 11. The result is shown in FIG. 8.

Figure 9:
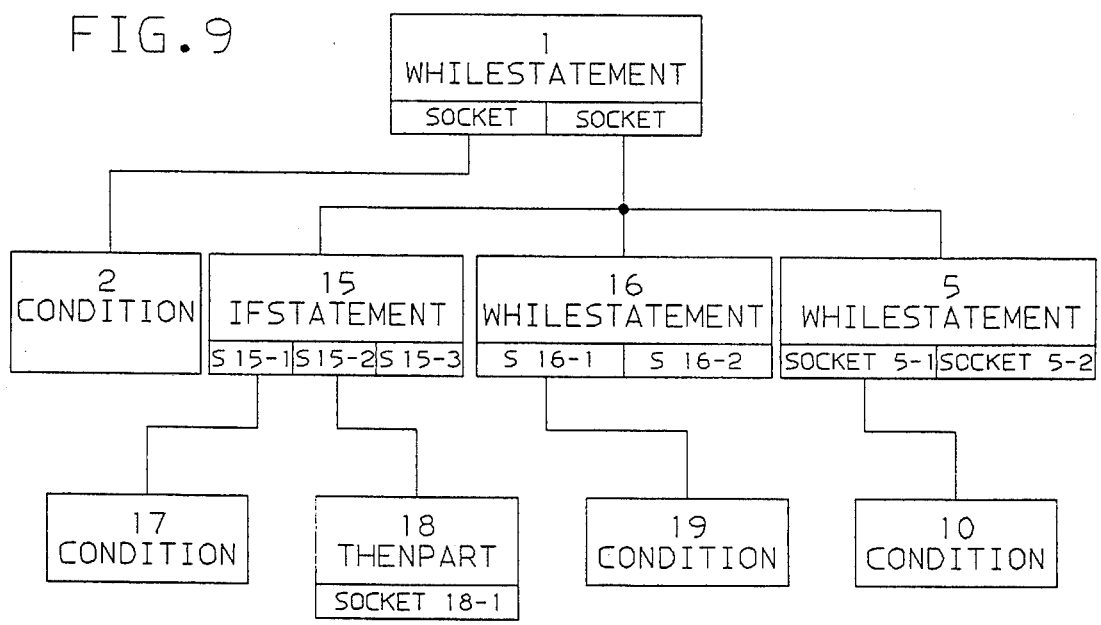
FIG. 9 is a tree like that shown in FIG. 7, after an exemplary replace operation.

FIG. 9 shows the results of replacing nodes 3 and 4, under node 1, with the IFSTATEMENT and a WHILESTATEMENT.

Figure 10:
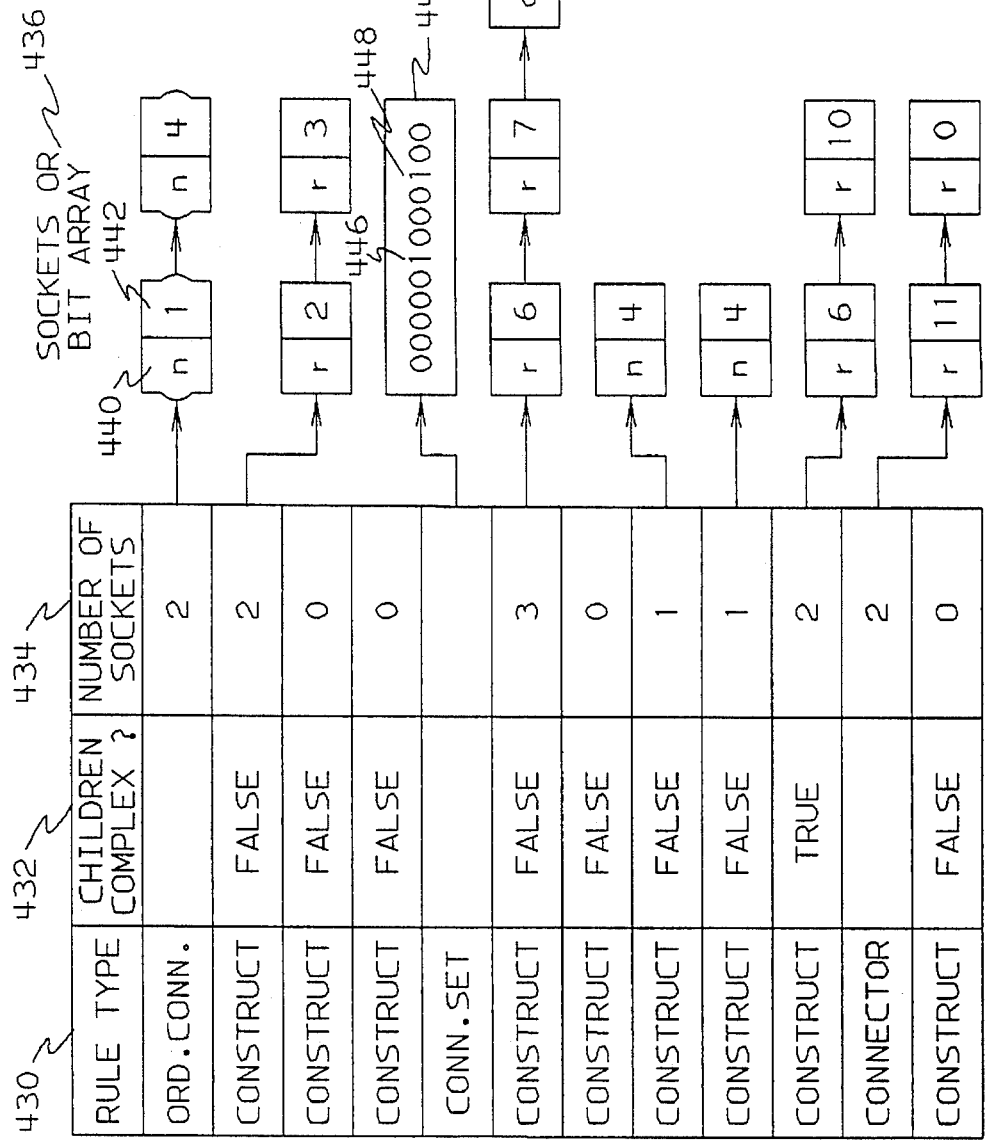
FIG. 10 shows a table useful in illustrating the principles of the extension to preferred embodiment of the present invention.
Figure 12:
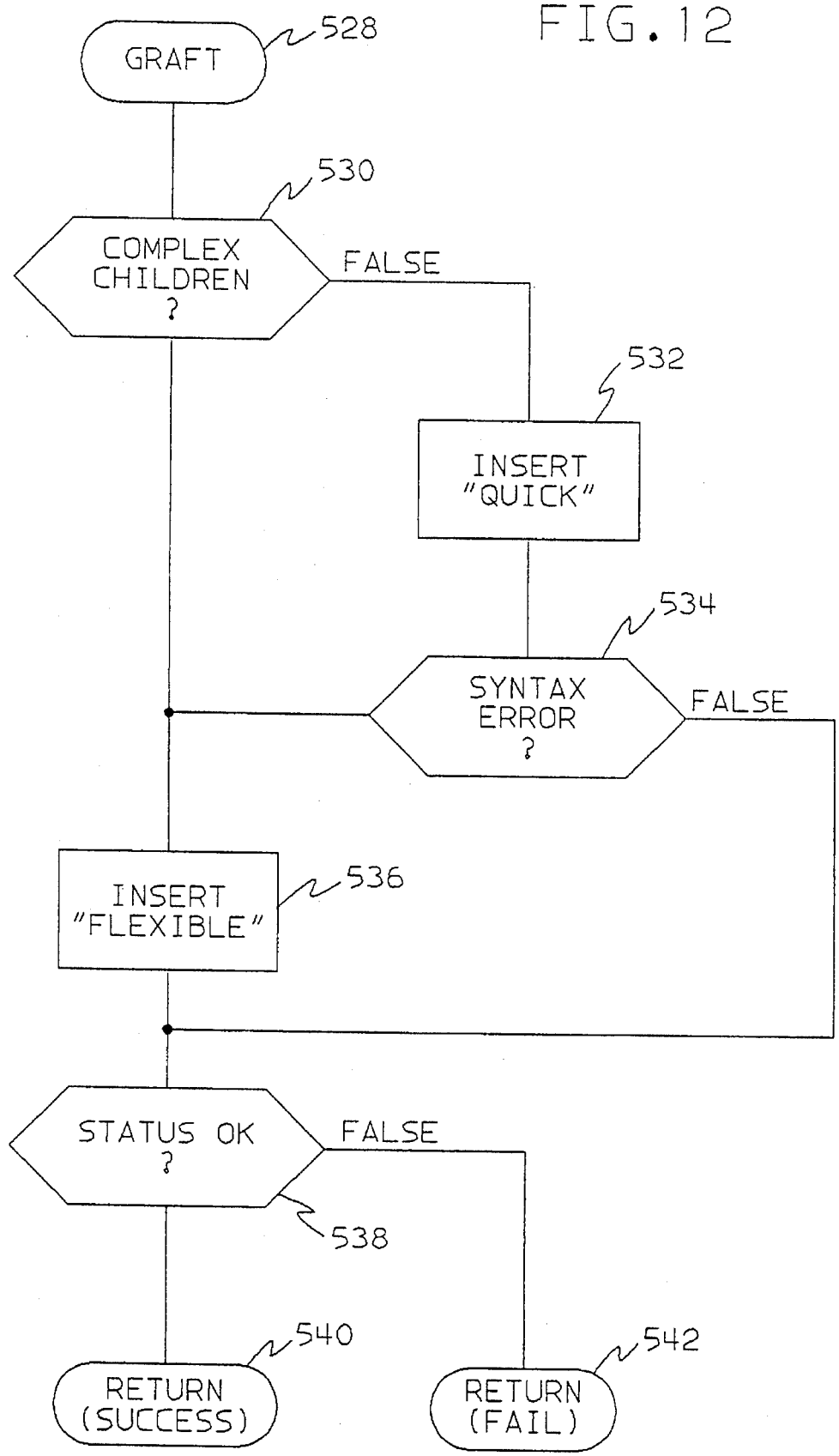
FIG. 12 is a flowchart depicting the process flow of the graft operation according to an extension to the preferred embodiment.
Figure 13:
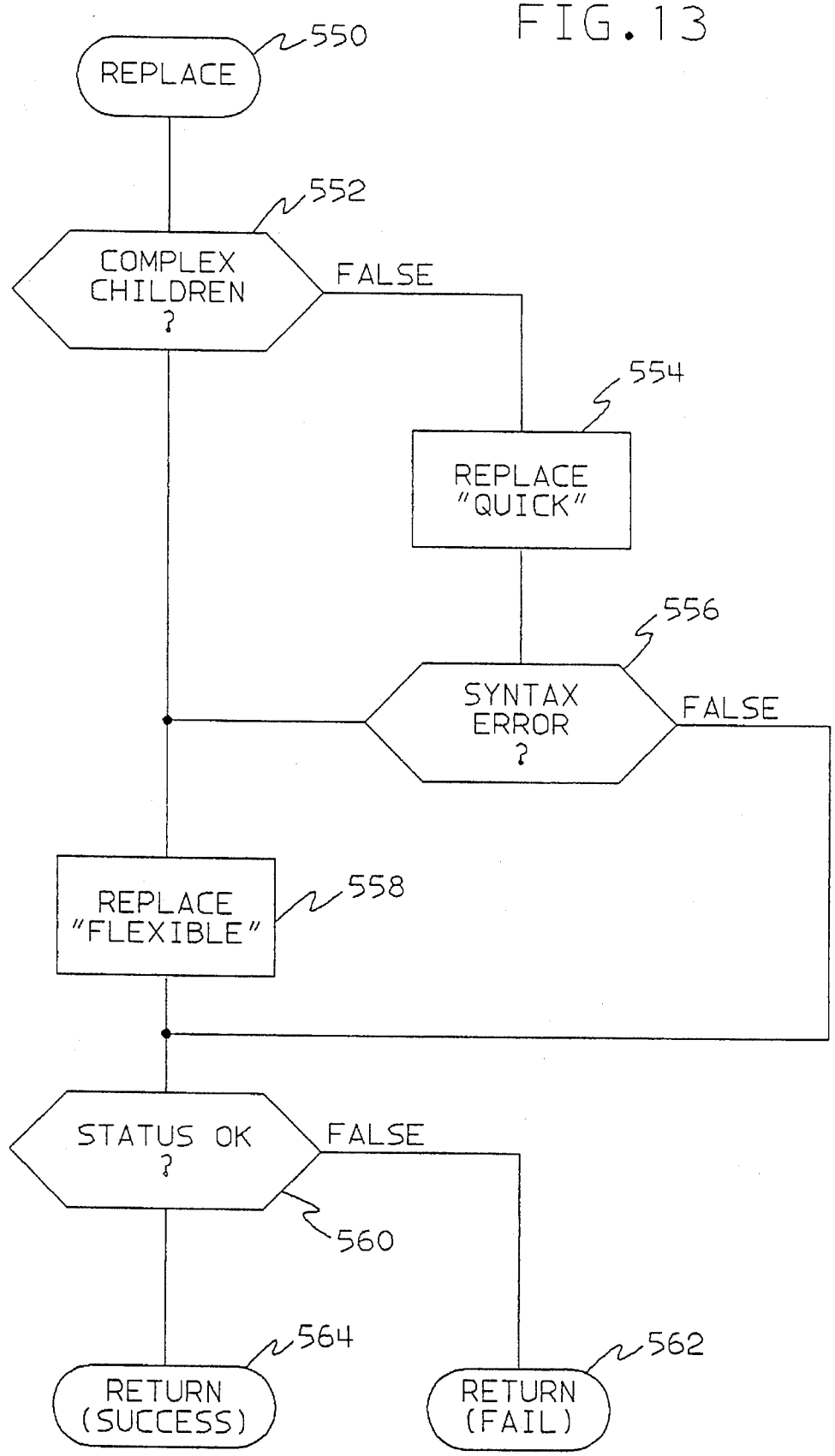
FIG. 13 is a flowchart depicting the process flow of the replace operation according to an extension to the preferred embodiment.

FIG. 10 shows a tabular form of the information contained in the example grammar, as well as implementations of the preferred embodiment of the present invention. It will be used to walk through the above graft and replace operations (shown in FIGS. 12 and 13 respectively).

There is one row in the table for every production in the grammar (e.g. "BLOCK" 402 ). Each production rule is assigned a rule number 403, and a rule name 405.

The "Rule Type" column tells which type of rule each production is.

The "Children Complex?" column 432 indicates whether connector or ordered connector rules are used as a connection rule for any of the sockets of a construct rule. If so, the children connecting to that socket are complex (True), if not, they are not complex (False). The "Children Complex?" field is used to determine whether a fast but inflexible graft or replace algorithm can be used (no complex children), or if a slower more flexible algorithm must be used.

The "Number of sockets" column 434 tells how many sockets are defined for a construct, connector, or ordered connector rule.

The "Sockets or Bit array" column 436 for construct, connector, and ordered connector rules contains a list of sockets. Each socket consists of a socket type (e.g. 440) (required (r), optional (o), or n-ary (n)) and a connection rule number (e.g. 442).

The "Sockets or Bit array" column for connector set rules contains a bit array (e.g. 444). The bit array consists of one bit for each rule (numbered 0 through n, the number of rules). A 1 value in a bit indicates that a node defined by the corresponding rule can be connected. In FIG. 10, rule 4 410, the bits corresponding to the IFSTATEMENT rule (bit number 5 446) and WHILESTATEMENT rule (bit number 9 448) are set to 1.

The steps involved in the graft operation discussed above, namely grafting an IFSTATEMENT and WHILESTATEMENT under node 9 and after node 11 of FIG. 7 resulting in the structure shown in FIG. 8 are (see FIG. 12):

1. Determine (Step 530) from the production definition, FIG. 10, that THENPART node 9 does not have complex children (complex children is false). This means the fast graft algorithm 532 can be used. (The fast algorithm only checks whether if the new children fit into the target socket. The slower algorithm checks all the children of the node to whether any of them need to be moved from one socket to another.)

2. Determine 534 whether the socket containing node 11 (the one being "inserted after") is n-ary. If so, the new nodes can be inserted, otherwise the graft fails since the socket is already occupied.

3. Determine 534 whether the connection rule for the socket allows the insertion of the types of nodes being grafted. The socket of node 9 is a "statement" socket (connection rule 4), which has a connector set connection rule type. The bit array associated with the rule 4 connector set specifies that IFSTATEMENT and WHILESTATEMENT nodes can be connected to this socket. The first node being inserted (node 15) is an IFSTATEMENT node. The second node (node 16) is a WHILESTATEMENT node. Thus both nodes can be inserted into the socket.

4. Insert the nodes into the socket.

The steps involved in replacing FIG. 7 nodes 3 and 4 with the IFSTATEMENT and WHILESTATEMENT resulting in FIG. 9 are:

1. Determine whether (WHILESTATEMENT node 1) has complex children. If so, the slower algorithm must be used. (The slower algorithm checks all the children of the node to see if any of them need to move from one socket to another.)

2. Build childrenList containing CONDITION node 2, IFSTATEMENT node 15, WHILESTATEMENT node 16, and WHILESTATEMENT node 5. These are the nodes which will become the new children of node 1 after the replace.

3. Determine whether CONDITION node 2 will fit into the first socket of WHILESTATEMENT node 1. It will because the first socket of a WHILESTATEMENT is a required socket connecting to a CONDITION construct. This fills the first socket of node 1.

4. Since node 1 has only one remaining socket, an attempt is made to insert nodes 15, 16, and 5 into the second socket. The connection rule for this socket is rule 10, nullorblock. Since nullorblock is a connector construction rule type, an attempt is made to insert the new nodes into each of its virtual sockets until one is found into which it can be inserted correctly. (A connector rule's sockets are called virtual sockets because they do not correspond to sockets in the resulting tree.)
  a. The first virtual socket of nullorblock is construct rule 11 NULLSTATEMENT. Since the next node to be inserted, IFSTATEMENT node 15, is not a NULLSTATEMENT, this test fails.
  b. The next virtual socket of nullorblock is an ordered connector rule 0, block. Parsing for an ordered connector rule is very similar to parsing for a construct rule. Movement is from left to right through the ordered connector's virtual sockets, with nodes being inserted along the way.
    1) The first virtual socket of rule 0, block, is n-ary with a connection rule DECLARE. Since the next node, IFSTATEMENT node 15, is not a DECLARE, it cannot be inserted in the virtual socket. But, the test does not fail, because n-ary sockets can have 0 children.
    2) The second socket of block is n-ary with a connection or rule of statement. statement is a connector set rule type that accepts either IFSTATEMENT or WHILESTATEMENT. Since the next three nodes (nodes 15, 16, and 5) are all IFSTATEMENTs or WHILESTATEMENTs, they are valid within this virtual socket. The parse is now finished and it has been determined how to connect nodes 2, 15, 16, and 5 to the sockets of node 1.
5. Remove all children from the sockets of WHILESTATEMENT node 1.
6. Connect CONDITION node 2 to the first socket of WHILESTATEMENT node 1, and connect IFSTATEMENT and WHILESTATEMENT nodes 15, 16, and 5 to the second socket of WHILESTATEMENT node 1.

7. Utility Functions Used by the Extension to the Preferred Embodiment

It is assumed that the following basic operations are available through utility functions:

Functions for manipulating trees. Tree manipulation is a well understood field. The operations are restricted to the simple ones listed here:

| | |
|---|---|
| getFirstChild | Returns the first child of a given node, or null if the node is childless. |
| getLastChild | Returns the last child of a given node, or null if the node is childless. |
| getRightSibling | Returns the right-hand sibling of a node, or null if the node is the last child of its parent. |
| getLeftSibling | Returns the left-hand sibling of a node, or null if the node is the first child of its parent. |
| insertNode | Insert a node under a parent node and after a left sibling. |
| removeNode | Remove a node from under a parent node. |

Functions for manipulating lists of items, specifically subtrees.

| | |
|---|---|
| create | Create a new empty list. |
| destroy | Destroy a list completely. |
| append | Add an item to the end of a list. |
| prepend | Add an item to the beginning of the list. |
| getFirst | Return the first item on the list. |
| getNext | Given a list and an item in the list, return the next item in the list, or null if the item given is the last. |

These functions are all well defined and well known throughout the industry.

8. Data Needed for the Extension to the Preferred Embodiment

Nodes require two pieces of associated data: a node type and a socket number. The node type defines the type of node, such as an IFSTATEMENT node or a WHILESTATEMENT node. The socket number identifies the socket of its parent occupied by a particular node. The method uses the node type of each node and the type of its parent to assign nodes to sockets. If a node cannot be assigned to a socket then the operation fails.

The node type field (which is the same as the connection rule that defines the node) is an index into the language definition table array. The socket field is an integer, indicating the socket to which the node is currently assigned.

The following operations are provided to manipulate the node data.

| | |
|---|---|
| getNodeType | Given a node, return its type. |
| getParentSocket | Given a node, return the socket it has been assigned to. |
| setParentSocket | Given a node and a socket index, assign that node to that socket. This functions does not check that the sockets are assigned in order amongst the children; it is the responsibility of graft and prune operations to do that. |

The Language Definition Table is an array of structures, indexed by connection rule number (which, when associated with nodes, is called the node type. The two terms will be used interchangeably in this discussion.) Note that only the connection rules with a construct connection rule type will actually be assigned to nodes. The other rules are used in the socket assignment process as connection rules. The data contained within the structures is different for each type of connection rule. The type of connection rule is always present in this structure, namely construct, connector set, connector, or ordered connector.

The following function returns the type of connection rule for a given connection rule number.

| | |
|---|---|
| getRuleType | Given a connection rule number, return the type of that connection rule. |

If the rule is a connector set type, a bitmap representing the valid construct node types for this connector set is contained in the rest of the structure. The following routine is defined to extract data from a connectorSet entry.

| | |
|---|---|
| inConnSet | Given a node type that indexes to a connector set and a node type to test, return true if the node type to test is in the set of node types that are valid, otherwise, return false. |

If the rule type is anything other than a connector set, then the structure contains the number of sockets defined for this rule and a list of socket descriptors. These are interpreted differently, however, based on the rule type. Each socket descriptor has a socket type field (required, optional, or n-ary) and a connection rule number that defines the connection rule used for that socket. The following functions are defined for extracting data from these entries.

| | |
|---|---|
| getNumSockets | Given a node type, return the number of sockets associated with that entry. This number may be zero. |
| getSocketType | Given a node type and a socket index, return the type of socket that is referenced by that index (required, optional, or nary). |
| getRule | Given a node type and a socket index, return the connection rule that is specified for that socket. |

In addition to the above functions, if the table entry is for a construct rule, the table contains an indication of whether any of the sockets of the construct use connector or ordered connector rules. This information is available because the graft and replace algorithms can take short cuts when connector and ordered connector rules are not used.

| | |
|---|---|
| complexChildren | Given a node type, return whether a complex connection rule (connector rule or ordered connector rule) is used as the connection rule for any socket of that node type. |

9. Base Function Definitions for the Extension to the Preferred Embodiment

Definitions of subroutines used to describe the extension to the method of the preferred embodiment follow.

I. parseSocket(parentType, socket, child, children, status):
Parse subtrees from a list of subtrees to see if they will fit under a socket.

parseSocket decides what type of connection rule is associated with the socket and branches to the appropriate routine.

| Inputs: | |
|---|---|
| parentType | The type of the parent node to attempt to parse the children under. |
| socket | The socket to attempt to parse the children under. |
| child | A subtree top from the children list. child is the first subtree top that to parse under the socket. |
| children | The list of subtrees to parse. |
| Outputs: | |
| status | Indicates whether the operation succeeded. It will fail if the children cannot be parsed according to the syntax rules of the grammar. |
| child | A subtree top from the children list. Child is the next subtree top that should be parsed. |

Method

1. Case getRuleType(getRule(parentType, socket)) [execute the proper type of parse depending on which type of rule defines the socket]
   a. Construct rule
      1) parseConstruct(parentType, socket, child, children, status)
   b. Connector Set rule
      1) parseConnSet(parentType, socket, child, children, status)
   c. Connector rule
      1) parseConn(parentType, socket, child, children, status)
   d. Ordered connector rule
      1) parseOrdConn(parentType, socket, child, children, status)

II. parseConstruct(parentType, socket, child, children, status):
Parse children of a specific construct type under a socket.

| Inputs: | |
|---|---|
| parentType | The type of the parent node to parse the children under. |
| socket | The socket to parse the children under. |
| child | A subtree top from the children list. child is the first subtree top to parse under the socket. |
| Outputs: | |
| status | Indicates whether the operation succeeded. It will fail if the children cannot be parsed according to the syntax rules of the grammar. |
| child | A subtree top from the children list. Child is the next subtree top that should be parsed. |

Method

1. Case getSocketType(parentType, socket) [do the correct type of parse depending on whether the socket is required, optional, or n-ary]
   a. required
      1) if child is null [there is no child available to put into the required socket]
         a) status=syntax error
      2) otherwise
         a) if getNodeType(child)= getRule(parentType, socket) [See if the child node has the same type as the rule specified for the socket]
            i. status=ok [this part of the parse succeeded]
            ii. child=getNext(children, child) [prepare to parse the next child]
         b) otherwise
            i. status=syntax error [wrong type of socket]
   b. optional
      1) if child is not null
         a) if getNodeType(child)= getRule(parentType, socket) [See if the child node has the same type as the rule specified for the socket]
            i. child=getNext(children, child) [prepare to parse the next child]
      2) status=ok [optional sockets can be empty, so they never cause failure]
   c. n-ary
      1) n-aryDone=false
      2) while n-aryDone is false
         a) if child is null
            i. n-aryDone is true
         b) otherwise
            i. if getNodeType(child)= getRule(parentType, socket) [See if the child node has the same type as the rule specified for the socket]
               i) child=getNext(children, child) [prepare to parse the next child]
            ii. otherwise
               i) n-aryDone=true
      3) status=ok [n-ary sockets can be empty, so they never cause failure]

III. parseConnset(parentType, socket, child, children, status):

Parse children according to the syntax defined in a connector set rule. Connector set rules consist of a set of construct rule numbers which are valid within a socket. Parsing is very simple: Determine whether the type of the next child is one of the valid construct rule numbers defined in the connector set.

Inputs:

| | |
|---|---|
| parentType | The type of the parent node to attempt to parse the children under. |
| socket | The socket to attempt to parse the children under. |
| child | A subtree top from the children list. Child is the first subtree top to attempt to parse under the socket. |
| children | The list of subtrees to parse. |

Outputs:

| | |
|---|---|
| status | Indicates whether the operation succeeded. It will fail if the children cannot be parsed according to the syntax rules of the grammar. |
| child | A subtree top from the children list. Child is the next subtree top that should be parsed. |

Method

1. Case getSocketType(parentType, socket) [do the correct type of parse depending on whether the socket is required, optional, or n-ary]
    a. required
        1) if child is null
            a) status=syntax error
        2) otherwise
            a) if inConnSet(getRule parentType, socket), getNodeType(child))
                i. status=ok [this part of the parse succeeded]
                ii. child=getNext(children, child) [prepare to parse the next child]
            b) otherwise
                i. status=syntax error
    b. optional
        1) if not child is null
            a) if inConnSet(getRule(parentType, socket), getNodeType(child))
                i. child=getNext(children, child) [prepare to parse the next child]
        2) status=ok [optional sockets can be empty, so they never cause failure]
    c. n-ary
        1) n-aryDone=false
        2) while n-aryDone is false
            a) if child is null
                i. n-aryDone is true
            b) otherwise
                i. if inConnSet(getRule(parentType, socket), getNodeType(child))
                    i) child=getNext(children, child) [prepare to parse the next child]
                ii. otherwise
                    i) n-aryDone=true
        3) status=ok [n-ary sockets can be empty, so they never cause failure]

IV. parseConn(parentType, socket, child, children, status):
Parse children according to the syntax defined in a connector rule. Connector rules consist of a list of virtual sockets. (Since connector rules do not define nodes in the tree, the virtual sockets only define the possible syntaxes the children can have, and do not define actual sockets to which nodes will be connected.)

The children are parsed into only one of these virtual sockets. Each virtual socket is tried from the first to the last, until one is found under which the children can be parsed.

Inputs:

| | |
|---|---|
| parentType | the type of the parent node to try to parse the children under. |
| socket | The socket to try to parse the children under. |
| child | A subtree top from the children list. child is the first subtree top to try to parse under the socket. |
| children | The list of subtrees to parse. |

Outputs:

| | |
|---|---|
| status | Indicates whether the operation succeeded. It fails if the children cannot be parsed according to the syntax rules of the grammar. |
| child | A subtree top from the children list. Child is the next subtree top that should be parsed. |

Method 1. connParentType=getRule(parentType, socket) [set an index into the table entry for the connector rule. This is passed to the routine that parses children under each connector rule virtual socket]
2. Case getSocketType(parentType, socket) [do the correct type of parse depending on whether the socket is required, optional, or n-ary]
    a. required or optional
        1) status=syntax error [initialize status for a while loop]
        2) connSocket=1
        3) While connSocket<= getNumSockets(connParentType) and status is syntax error [try to parse under each virtual socket until either virtual sockets are run out of or until a virtual socket parses without a syntax error]
            a) connChild=[create a local copy of child so parseSocket won't update child when status is not ok. child is only updated when it is known that a group of children has been parsed correctly within a virtual socket]
            b) parseSocket(connParentType, connSocket, connChild, children, status) [try to parse under the virtual socket]
            c) connSocket=connSocket+1
        4) if status is ok
            a) child=connChild [get ready to parse the next child]
        5) otherwise
            a) if getSocketType(parentType, socket) is optional
                i. status=ok [the optional socket is empty]
    b. n-ary
        1) n-aryDone=false
        2) while n-aryDone is false
            a) status=syntax error [initialize status for while loop]
            b) connSocket=1
            c) While connSocket<= getNumSockets(connParentType) and status is syntax error [try to parse with each virtual socket until either virtual sockets are run out of or until a virtual socket parses without a syntax error]

i. connChild=child [make a local copy of child so parseSocket won't update child when status is not ok. Update child only when it is known that a group of children has been parsed correctly within a virtual socket]
ii. parseSocket(connParentType, connSocket, connChild, children, status) [try to parse under the virtual socket]
iii. connSocket=connSocket+1
d) If status is not ok or connChild=child
i. n-aryDone=true
e) otherwise
i. child=connChild [prepare to parse the next child]
3) status=ok [n-ary sockets can be empty, so they never cause failure]

V. parseOrdConn(parentType, socket, child, children, status):

Parse children according the syntax defined in an ordered connector rule. Ordered connector rules consist of a list of virtual sockets (Since ordered connector rules do not define nodes in the tree, the virtual sockets only define the order in which children can be specified, and do not define actual sockets to which nodes will be connected.)

The parsing algorithm tries to parse into the sockets one after another.

| Inputs: | |
|---|---|
| parentType | The type of the parent node to attempt to parse the children under. |
| socket | The socket to attempt to parse the children under. |
| child | A subtree top from the children list. child is the first subtree top to attempt to parse under the socket. |
| children | The list of subtrees to parse. |
| Outputs: | |
| status | indicates whether the operation succeeded. It will fail if the children cannot be parsed according to the syntax rules of the grammar. |
| child | A subtree top from the children list. Child is the next subtree top that should be parsed. |

Method 1. ordConnParentType=getRule(parentType, socket) [set an index into the table entry for the ordered connector rule. This is passed to the routine that parses children under each ordered connector rule virtual socket]
2. Case getSocketType(parentType, socket) [do the correct type of parse depending on whether the socket is required, optional, or n-ary]
   a. required or optional
      1) ordConnChild=child [create a local copy of child so parseSocket won't update child when status is not ok. Update child only when it is known that a group of children has been parsed correctly under the entire ordered connector rule]
      2) status=ok [initialize status for while loop]
      3) ordConnSocket=1
      4) While ordConnSocket<= getNumSockets(ordConnParentType) and status is ok [try to parse under each virtual socket until either parsing is finished under all virtual sockets, or until a syntax error is detected]
         a) parseSocket(ordConnParentType, ordConnSocket, ordConnChild, children, status) [try to parse the children within the ordered connector rule's virtual socket]
         b) ordConnSocket=ordConnSocket+1
      5) if status is ok
         a) child=ordConnChild [get ready to parse the next child]
      6) otherwise
         a) if getSocketType(parentType, socket) is optional
            i. status=ok [the optional socket is empty]
   b. n-ary
      1) n-aryDone=false
      2) while n-aryDone is false
         a) ordConnChild=child [create a local copy of child so parseSocket won't update child when status is not ok. Update child only when it is known that a group of children has been parsed correctly under the entire ordered connector rule]
         b) status=ok [initialize status for while loop]
         c) ordConnSocket=1
         d) While ordConnSocket<= getNumSockets(ordConnParentType) and status is ok [try to parse under each virtual socket until either parsing is finished under all virtual sockets, or until a syntax error is detected]
            i. parseSocket(ordConnParentType, ordConnSocket, ordConnChild, children, status) [try to parse the children under the ordered connector rule's virtual socket]
            ii. ordConnSocket=ordConnSocket+1
         e) If status is not ok or ordConnChild= child
            i. n-aryDone=true
         f) Otherwise
            i. child=ordConnChild [prepare to parse the next child]
      3) status=ok [n-ary sockets can be empty, so they never cause failure]

VI. parseChildren(parentType, firstSocket, lastSocket, children, status):

See if a list of children can be parsed to fit into a range of sockets within a parent node. If so, call setParentSocket() to record what socket they belong in.

| Inputs: | |
|---|---|
| parentType | The type of the parent to attempt to parse the children under. parenttype is always a construct rule. |
| firstSocket | The first socket of the range of sockets to try to parse the children into. firstSocket is an integer. |
| lastSocket | The last socket of the range of sockets to try to parse the children into. lastSocket is an integer. |
| children | The list of subtrees to parse. |
| Outputs: | |
| status | Indicates whether the operation succeeded. It will fail if the new nodes cannot be inserted according to the syntax rules of the grammar. |

Method 1. child=getFirst(children)
2. status=ok
3. socket=firstSocket
4. while socket<=lastSocket and status=ok
   a. nextChild=child [Save the child we started parsing was started from. This is needed to record what socket the children should be placed within]

b. parseSocket(parentType, socket, child, children, status) [try to parse the children under the socket]

c. if status=ok 1) while nextChild is not child [loop through the children that were just parsed. Record the socket that each child should be placed within]

a) setParentSocket(nextChild, socket)

b) nextChild=getNext(children, nextChild)

d. socket=socket+1

5. If status is ok a. if child not null [if all of the children were used in the parse, child will be null]

a) status=syntax error [all of the children were not used in the parse, this is a syntax error]

VII. removeChildren(firstChild, lastChild):

Remove a range of subtrees from beneath a parent node. Do not check the syntax of the result.

| Inputs: | |
|---|---|
| firstChild | The first child that is to be removed. |
| lastChild | The last child that is to be removed. |

Method 1. prevChild=null
2. child=firstChild
3. While prevChild not lastChild [remove the subtrees]

a. prevChild=child b. child=getRightSibling(child)

c. removeNode(prevChild)

VIII. insertChildren(leftSibling,Children)

Insert a list of subtrees after a left sibling. Do not check the syntax of the children.

| Inputs: | |
|---|---|
| leftSibling | The child of parent that is to be the left sibling of the left-most node in the list of subtrees. This may be null if the list is to be inserted as the left-most children under parent. |
| children | The list of subtrees to insert. |

Method 1. prevChild=leftSibling
2. child=getFirst(children)
3. While child not null [insert the subtrees under parent]

a. insertNode(prevChild,child)

b. prevChild=child c. child=getNext(children,child)

IX. insertFlexible(parent, leftSibling, newNodes, Status):

Insert a list of subtrees below a parent and after a left sibling.

The nodes at the top of the subtrees are assigned to sockets under the parent such that the tops match the connection rules of those sockets. If the subtrees cannot be assigned to sockets, the insert fails.

insertFlexible performs the same function as insertQuick, but uses a slower, more flexible algorithm.

| Inputs: | |
|---|---|
| parent | The node under which the list of subtrees are inserted. |
| leftSibling | The child of parent that is to be the left sibling of the left-most node in the list of subtrees. This may be null if the list is to be inserted as the left-most children under parent. |
| newNodes | The list of subtrees to insert. |
| Outputs: | |
| status | Indicates whether the operation succeeded. It fails if the new nodes cannot be inserted according to the syntax rules of the grammar. |

Method 1. create(childList) [create a list which will hold all the children of parent]
2. childList=newNodes
3. child=leftSibling
4. While child not null [prepend children which are to the left of the new nodes]

a. prepend(childList,child)

b. child=getLeftSibling(child)

5. child=getRightSibling(leftSibling)
6. While child not null [append children which are to the right of the new nodes]

a. append(childList,child)

b. child=getRightSibling(child)

7. firstSocket=1
8. lastSocket=getNumSockets(parent)
9. parentType=getNodeType(parent)
10. parseChildren(parentType, null, firstSocket, lastSocket, childList, status) [parse to determine if the syntax of the children is correct]
11. if status is ok a. removeChildren(getFirstChild(parent), getLastChild(parent)) [remove all children under parent]

b. insertChildren(null, childList) [Insert the new children under parent]

12. destroy(childList)

X. insertQuick(parent, leftSibling, newNodes, status):

Insert a list of subtrees below a parent and after a left sibling.

The nodes at the top of the subtrees are assigned to sockets under the parent such that the tops match the connection rules of those sockets. If the subtrees cannot be assigned to sockets, the insert fails.

insertQuick performs the same function as insertFlexible but uses a faster, less flexible algorithm.

| Inputs: | |
|---|---|
| parent | The node under which the list of subtrees are inserted. |
| leftSibling | The child of parent that is to be the left sibling of the left-most node in the list of subtrees. This may be null if the list is to be inserted as the left-most children under parent. |
| newNodes | The list of subtrees to insert. |
| Outputs: | |
| status | Indicates whether the operation succeeded. It fails if the new nodes cannot be inserted according to the syntax rules of the grammar. |

Method 1. parentType=getNodeType(parent)
2. if leftSibling is null
   a. nextChild=getFirstChild(parent) [child to be inserted before]
   b. firstSocket=1 [newNodes are inserted as the first children under parent. Start inserting at the first socket under parent]
3. otherwise
   a. nextChild=getRightSibling(child) [get the child the new nodes will be inserted before]
   b. childSocket=getParentSocket(leftSibling) [get the socket that leftSibling is contained in]
   c. if getSocketType(parentType, childSocket) is n-ary [see if leftSibling is within an n-ary socket. Insertion can only occur into it if it is]
      1) firstSocket=childSocket [try to insert into the same socket as leftSibling]
   d. Otherwise
      1) firstSocket=childSocket+1 [try to insert into the socket after the one containing leftSibling]
4. if nextChild is null
   a. lastSocket=getNumSockets(parentType) [newNodes is being inserted after all other children. Finish inserting at the last socket under parent]
5. Otherwise
   a. nextChildSocket=getParentSocket(nextChild) [get the socket that contains the nextChild]
   b. if getSocketType(parentType, nextChildSocket) is n-ary [see if the next child is within an n-ary socket. Insertion can only occur into it if it is]
      1) lastSocket=nextChildSocket [try to insert into the socket containing nextChild if necessary]
   c. Otherwise
      1) lastSocket=nextChildSocket−1 [the last socket to try to insert into is the one before nextChildSocket]
6. parseChildren(parentType, firstSocket, lastSocket, newNodes, status) [parse to determine if the children in newNodes can be correctly inserted below parent. The nodes in newNodes are parsed as if they were the only nodes in the sockets. Any other children within the sockets can be ignored because it is known that connector rules and ordered connector rules are not used]
7. if status is ok
   a. insertChildren(leftSibling, newNodes) [insert the children]

XI. replaceFlexible(parent, firstChild, lastChild, newNodes, status):

Replace the children between firstChild and lastChild with the subtrees in newNodes.

The nodes at the top of the subtrees are assigned to sockets under the parent such that the tops match the connection rules of those sockets. If the subtrees cannot be correctly assigned to sockets, the replace fails.

replaceFlexible performs the same function as replaceQuick, but uses a slower, more flexible algorithm.

Inputs:

| parent | The node under which to replace the list. |
| firstChild | The first child in the range of children that will be replaced. firstChild must either be equal to lastChild or to the left of lastChild. |
| lastChild | The last child in the range of children that will be replaced. |
| newNodes | The list of subtrees to insert. |

Outputs:

| status | Indicates whether the operation succeeded. It fails if the new nodes cannot be replaced according to the syntax rules of the grammar. |

Method 1. create(childList) [create a list which will hold all the children of parent]
2. childList=newNodes
3. child=getLeftSibling(firstChild)
4. While child is not null [prepend children which are to the left of the range being replaced]
   a. prepend(childList,child)
   b. child=getLeftSibling(child)
5. child=getRightSibling(lastChild)
6. While child not null [append children which are to the right of the range being replaced]
   a. append(childList, child)
   b. child=getRightSibling(child)
7. firstSocket=1
8. lastSocket=getNumSockets(parent)
9. parentType=getNodeType(parent)
10. parseChildren(parentType, null, firstSocket, lastSocket, childList, status) [parse to determine if the syntax of the children is correct]
11. if status is ok
    a. removeChildren(getFirstChild(parent), getLastChild(parent)) [remove all children]
    b. insertChildren(null, childList) [insert all new children]
12. destroy(childList)

XII. replaceQuick(parent, firstChild, lastChild, newNodes, status):

Replace the children between firstChild and lastChild with the subtrees in newNodes.

The nodes at the top of the subtrees are assigned to sockets under the parent such that the tops match the connection rules of those sockets. If the nodes cannot be correctly assigned to sockets, the replace fails.

replaceQuick performs the same function as replaceFlexible but uses a faster, less flexible algorithm.

Inputs:

| firstChild | The first child in the range of children that will be replaced. firstChild must either be equal to lastChild or to the left of lastChild. |
| lastChild | The last child in the range of children that will be replaced. |
| newNodes | The list of subtrees to insert. |

Outputs:

| status | Indicates whether the operation succeeded. It fails if the new nodes cannot be replaced according to the syntax rules of the grammar. |

Method 1. leftSibling=getLeftSibling(firstChild)
2. rightSibling=getRightSibling(lastChild)
3. parentType=getNodeType(parent)

4. if leftSibling is null
   a. firstSocket=1 [insert newNodes as the first children under parent]
5. Otherwise
   a. childSocket=getParentSocket(leftSibling) [get the socket that leftSibling is contained in]
   b. if getSocketType(parentType,childSocket) is n-ary [see if leftSibling is within an n-ary socket. Insertion can only occur into it if it is]
      1) firstSocket=childSocket [try to insert into the same socket as leftSibling]
   c. Otherwise
      1) firstSocket=childSocket+1 [try to insert into the socket after the one containing leftSibling]
6. if rightSibling is null
   a. lastSocket=getNumSocket(parentType) [insert newNodes as the last children under parent]
7. Otherwise
   a. childSocket=getParentSocket(rightSibling) [get the socket that contains the right sibling]
   b. if getSocketType(parentType,childSocket) is n-ary [see if the right sibling is within an n-ary socket. Insertion can only occur into it if it is]
      1) lastSocket=childSocket [try to insert up to the child containing rightSibling]
   c. Otherwise
      1) lastSocket=childSocket−1 [the last socket to try to insert into is the one before the one containing rightSibling]
8. parseChildren(parentType, firstSocket, lastSocket, newNodes, status) [parse to determine if the children in newNodes can be correctly inserted below parent. The nodes in newNodes are parsed as if they were the only nodes in the sockets. Any other children within the sockets can be ignored because it is known that connector rules and ordered connector rules are not used]
9. if status is ok
   a. removeChildren(firstChild,lastChild) [remove children in the specified range]
   b. insertChildren(leftSibling,newNodes) [insert replacement children]
10. Main Functions of Extension The following functions are defined using the preceding subroutines. These functions provide the high level view of the high performance graft and replace operations according to the extension to the preferred embodiment. (Refer to FIG. 12 and FIG. 13 for flowcharts depicting the process flow.) These syntax checking versions of graft and replace are substituted for the standard graft and replace functions used in the preferred embodiment to create a syntax directed editor. Editor function is identical, but tree collection, pasting, and deleting operations are allowed only where syntactically correct structures result.

A. graft(parent, leftSibling, newNodes, status) 528:

Given a parent, a left sibling, and a list of subtrees, insert the list of subtrees under parent after the left sibling.

The nodes at the top of the subtrees are assigned to sockets under the parent such that the tops match the connection rules of those sockets. If the nodes cannot be assigned to sockets, the graft operation fails.

Inputs:

parent    The node under which to insert the

-continued

| | |
|---|---|
| | list of subtrees. |
| leftSibling | The child of parent that is to be the left sibling of the left-most node in the list of subtrees. This may be null if the list is to be inserted as the left-most children under parent. |
| newNodes | The list of subtrees to insert. |
| Outputs: | |
| status | Indicates whether the graft succeeded. It fails if the new nodes cannot be inserted according to the syntax rules of the grammar. |

Method

1. If complexChildren(getNodeType(parent)) 530 [see if connector rules or ordered connector rules were used to define the children below parent]
   a. insertFlexible(parent, leftSibling, newNodes, status) 536 [insert the nodes below parent using the slower more flexible parsing algorithm]
2. Otherwise [connector and/or ordered connector rules are not used to describe the correct syntax of parent's children. A faster less flexible parsing algorithm can therefore be used. In real programming languages, this path gets taken most of the time.]
   a. insertQuick(parent, leftSibling, newNodes, status) 532 [insert the nodes below parent using the faster less flexible algorithm]
   b. If status is syntax error 534 [occasionally, a sequence of editing operations causes insertQuick to fail even on valid insertions. Therefore, all failures are reparsed with a more flexible algorithm. Since most grafts succeed, this path does not get taken very often]
      1) insertFlexible(parent, leftSibling, newNodes, status) 536 [reparse with the more flexible algorithm]
3. if status not ok
   a. Fail 542

B. replace(parent, firstChild, lastChild, newNodes, status) 550:

Given a parent, a first child in a range, a last child in a range, and list of subtrees, replace the range of children with the list of subtrees.

The nodes at the top of the subtrees are assigned to sockets under the parent such that the tops match the connection rules of those sockets. If the nodes cannot be assigned to sockets, the replace operation fails.

Inputs:

| | |
|---|---|
| parent | The node under which to insert the list of subtrees. |
| firstChild | The first child in a range of children that will be replaced. firstChild must either be equal to lastChild or must be to the right of lastChild. |
| lastChild | The last child in a range of children that will be replaced. |
| newNodes | The list of subtrees to insert. |
| Outputs: | |
| status | Indicates whether the replace succeeded. It fails if the new nodes cannot be inserted according to the syntax rules of the grammar. |

Method

1. If complexChildren(getNodeType(parent)) 552 [see if connector rules or ordered connector rules were used to define the children below parent]
   a. replaceFlexible(parent, firstChild, lastChild, newNodes, status) 558 [replace the nodes below parent using the slower more flexible algorithm]
2. Otherwise [connector and/or ordered connector rules are not used to describe the correct syntax of parent's children. A faster less flexible parsing algorithm can therefore be used. In real programming languages, this path gets taken most of the time.]
   a. replaceQuick(parent, firstChild, lastChild, newNodes, status) 554 [insert the nodes below parent using the faster less flexible algorithm]
   b. If status is syntax error 556 [occasionally, a sequence of editing operations causes replaceQuick to fail even on valid replacements. Therefore, all failures are reparsed with the more flexible algorithm. Since most replaces succeed, this path does not get taken very often.]
      1) replaceFlexible(parent, firstChild, lastChild, newNodes, status) 558 [reparse with the more flexible algorithm]
3. If status not ok
   a. Fail 562

The preceding description of the preferred embodiment and an extension are presented by way of example. Other alternatives and modifications will be apparent to those skilled in the art.

We claim:

1. A data processing system implemented method for maintaining syntactically correct connections between a first data element and a second data element wherein said data processing system includes storage means, processing means, and operator interaction means, said method comprising the steps of:

creating a list of permitted data element types;

storing in said storage means a first level syntax rule for each data element type;

storing in said storage means second level syntax rules that refer directly or indirectly through one or more second level syntax rules to said first level syntax rules to specify valid relationships;

wherein said syntax rules define lists of relationships that may be established between said data element types, said relationships defining the number of connections that may be established, and the data element types that may be connected;

locating one of said first level syntax rules corresponding to said first data element type;

testing said second data element to determine whether said second data element is of a data element type that may be connected to said first data element; if not, no relationship may be established; and establishing a connection between said first data element and said second data element, if permitted.

2. In a data processing system structure editor in which data elements or nodes of different types are added, copied, deleted, moved, or inserted into a hierarchical structure or tree comprised of data elements in a storage means of said data processing system, a method for connecting nodes comprising the steps of:

selecting nodes to be connected to said tree;

storing in said storage means a first set of rules specifying permitted hierarchical relationships and order relationships between nodes in said tree;

selecting a relationship to be established between said selected nodes and nodes in said tree;

testing said selected relationship using said first set of rules applied to said selected nodes and generating potential connections between said selected nodes and said nodes in said tree;

storing in said storage means a second set of rules specifying types of nodes that may be connected in said tree;

testing each of said generated connections using said second set of rules to determine whether said second set of rules is satisfied by said generated connection; and if said second set of rules is satisfied, making said generated connection.

3. A method of manipulating data organized as a hierarchy or tree with a single root data element and one or more lower layers of subsidiary (child) data elements such that zero, one or more subsidiary data elements are related to only one parent data element in the next higher level in the hierarchy wherein said data is stored in a storage means of a data processing system, and said manipulating is performed by said data processing system in response to operator directions, said method of manipulating data comprising the steps of:

(a) selecting from said hierarchically organized data elements a plurality of data elements for manipulation, said data elements being selected without regard to their relationship to other selected data elements; and (b) collecting said selected data elements into a collected list of subtrees that maintain the existing hierarchical relationships, said subtrees being formed by connecting said selected data elements by a simple link, said collected list containing one entry for each of said subtrees, said collecting step comprising the steps of:
   (1) identifying highest-order data elements selected;
   (2) creating copies of said highest-order data elements;
   (3) identifying all selected data elements hierarchically related to each of said highest-order data elements;
   (4) copying said related data elements; and
   (5) connecting said copies of said related data elements to said copy of said each of said highest-order data elements to form a simply connected subtree wherein said hierarchical relationships are preserved.

4. The method of claim 3, comprising the further steps of:

(c) specifying a target data element and a relationship between said selected data elements and said target data element; and (d) inserting said collected list into said hierarchy at said target data element so that said relationship is established.

5. The method of claim 3, wherein each data element is classified into a type category and wherein the method further comprises the step of specifying permitted relationships between data elements, said permitted relationships defining when and how data elements of different types may be connected.

6. The method of claim 5, wherein said collecting step (b) comprises the further step of determining whether each of said selected data elements identified as hierarchically related to a highest-order data element can be connected to said highest-order data element according to said permitted relationships, said steps (c)(4) and (c)(5) being performed only if permitted according to said relationships.

7. A method of manipulating data organized as a hierarchy or tree with a single root data element and one or more lower layers of subsidiary (child) data elements such that zero, one or more subsidiary data elements are related to only one parent data element in the next higher level in the hierarchy wherein said data is stored in a storage means of a data processing system, and said manipulating is performed by said data processing system in response to operator directions, said method of manipulating data comprising the steps of:

(a) selecting from said hierarchically organized data elements a plurality of data elements for removal, said data elements being selected without regard to their relationship to other selected data elements;

(b) grouping said selected data elements into simply connected groups such that each element of a group is connected to at most one data element in the hierarchical layer immediately above its layer while preserving existing hierarchical relationships; and (c) for each simply connected group:
  (1) identifying the highest-order data element in said group;
  (2) identifying the parent data element of said highest-order data element;
  (3) identifying all data elements connected to one of said selected data elements in said group but not selected;
  (4) removing all data elements contained in said group from said tree; and
  (5) connecting to said parent of said highest-order data elements all data elements connected to said group but not removed.

8. The method of claim 7, wherein each data element is classified into a type category and wherein the method further comprises the step of specifying permitted relationships between data elements, said permitted relationships defining when and how data elements of different types may be connected.

9. The method of 8, wherein said step (c)(5) is performed only if such connection establishes a permitted relationship.

10. The method of claim 7 in which said step (c) comprises the further step of:
  (6) connecting the removed data elements in said simply connected group to previously removed data elements so that the hierarchical relationships are preserved.

11. The method of claim 10, wherein each data element is classified into a type category and wherein the method further comprises the step of specifying permitted relationships between data elements, said permitted relationships defining when and how data elements of different types may be connected.

12. The method of claim 11, wherein said steps (c)(5) and (c)(6) are performed only if such connections establish permitted relationships.

13. A method of manipulating data organized as a hierarchy or tree with a single root data element and one or more lower layers of subsidiary (child) data elements such that zero, one or more subsidiary data elements are related to only one parent data element in the next higher level in the hierarchy wherein said data is stored in a storage means of a data processing system, and said manipulating is performed by said data processing system in response to operator directions, each of said data elements being classified into a type category, said method of manipulating data comprising the steps of:

(a) specifying permitted relationships between data elements, said permitted relationships defining when and how data elements of different types may be connected, said specifying step comprising the steps of defining the type of data elements allowed, defining the nature of connections allowed and, for each data element type, specifying the types of data elements which can be connected to said data element type and the nature of connection allowed;

(b) selecting an operation to be performed;

(c) selecting from said hierarchically organized data elements or creating a plurality of data elements for manipulation, said data elements being selected without regard to their relationship to other selected data elements;

(d) performing said selected operation on said selected or created data elements only if such operation establishes permitted relations between said data elements.

14. A method of inserting a list of subtrees comprising a plurality of simply connected data elements constituting nodes into a tree in relation to a selected target node having a parent node, said list of subtrees being maintained in a storage means of a data processing system, said method being performed by said data processing system in response to selections and directions of an operator through operator interaction means, said method comprising the steps of:

(a) specifying a relationship between said list of subtrees and said target node;

(b) if said relationship is specified as "left" or "right", connecting each subtree in the list of subtrees to said parent such that said subtree is connected to said parent before said target node, if left, or after said target node, if right;

(c) if said relationship is specified as "around":
  (1) disconnecting said target node from said parent node;
  (2) connecting each subtree in said list of subtrees to said parent node as subsidiary data elements thereof; and
  (3) connecting said disconnected target node to said list of subtrees;

(d) if said relationship is specified as "within":
  (1) disconnecting the subsidiary data elements of said target node;
  (2) connecting each subtree in said list of subtrees to said target node as subsidiary data elements thereof; and
  (3) connecting said disconnected subsidiary data elements to each subtree in said list of subtrees.

15. The method of claim 14, wherein each of said data elements in said subtrees is classified into a type category and wherein the method further comprises the step of specifying permitted connections between data elements, said permitted connections defining the types of data elements that may be connected and the type of relationships permitted between types of data elements.

16. The method of claim 15, wherein the connecting steps of steps (b)–(d) are performed only if a permitted relationship is established.

* * * * *

UNITED STATES PATENT AND TRADEMARK OFFICE
CERTIFICATE OF CORRECTION

PATENT NO. : 5,493,678
DATED : Feb. 20, 1996
INVENTOR(S) : Anthony J. Arcuri et al.

It is certified that error appears in the above-indentified patent and that said Letters Patent is hereby corrected as shown below:

TITLE:  "METHOD IN A STRUCTURE EDITOR" should be --FLEXIBLE SCOPE EDITING METHOD IN A STRUCTURE EDITOR--

Signed and Sealed this

Thirtieth Day of July, 1996

Attest:

BRUCE LEHMAN

*Attesting Officer*   *Commissioner of Patents and Trademarks*